United States Patent
Seifi et al.

(10) Patent No.: US 10,455,169 B2
(45) Date of Patent: Oct. 22, 2019

(54) METHOD AND APPARATUS FOR CORRECTING VIGNETTING EFFECT CAUSED ON AN IMAGE CAPTURED BY LIGHTFIELD CAMERAS

(71) Applicant: INTERDIGITAL CE PATENT HOLDINGS, Paris (FR)

(72) Inventors: Mozhdeh Seifi, Thorigne-Fouillard (FR); Valter Drazic, Betton (FR); Paul Kerbiriou, Thorigne-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 28 days.

(21) Appl. No.: 15/379,710

(22) Filed: Dec. 15, 2016

(65) Prior Publication Data

US 2017/0171479 A1 Jun. 15, 2017

(30) Foreign Application Priority Data

Dec. 15, 2015 (EP) .................................. 15307003

(51) Int. Cl.
*G06T 5/00* (2006.01)
*H04N 9/07* (2006.01)
(Continued)

(52) U.S. Cl.
CPC .......... *H04N 5/3572* (2013.01); *G06T 5/006* (2013.01); *H04N 5/2254* (2013.01);
(Continued)

(58) Field of Classification Search
None
See application file for complete search history.

(56) References Cited

U.S. PATENT DOCUMENTS 7,502,057 B2 3/2009 Whitman et al.
8,023,758 B2 * 9/2011 Hung ...................... G06T 5/006
356/124

(Continued)

FOREIGN PATENT DOCUMENTS

| CN | 102692347 | 9/2012 |
|---|---|---|
| EP | 3104596 | 12/2016 |
| EP | 3112920 | 1/2017 |

OTHER PUBLICATIONS

Wang et al., "Angle-sensitive pixels: a new paradigm for low-power, low-cost 2D and 3D sensing", Proceedings of the SPIE, The International Society for Optical Engineering, Stereoscopic Displays and Applications XXIII, vol. 8288, Feb. 12, 2012, pp. 1-13.

(Continued)

*Primary Examiner* — Roberto Velez
*Assistant Examiner* — Quan Pham
(74) *Attorney, Agent, or Firm* — Lily Neff

(57) ABSTRACT

The disclosure addresses the vignetting effect caused on an image captured by lightfield camera. A method to compensate for the vignetting effect for a lightfield camera comprising an image sensor array including plurality of photosites. The method includes the operations of obtaining luminance values from the each photosite; obtaining a set of weight values for compensating the vignetting effect for the each photosite being associated with a present setting of the lightfield camera; and changing the luminance values of the each photosite based on the obtained a set of the weight values.

5 Claims, 17 Drawing Sheets

(51) Int. Cl.
*H04N 9/64* (2006.01)
*G06T 7/557* (2017.01)
*H04N 5/225* (2006.01)
*H04N 5/238* (2006.01)
*H04N 5/341* (2011.01)
*H04N 5/357* (2011.01)

(52) U.S. Cl.
CPC ......... *H04N 5/22541* (2018.08); *H04N 5/238* (2013.01); *H04N 5/3415* (2013.01); *H04N 9/07* (2013.01); *H04N 9/646* (2013.01); *G06T 7/557* (2017.01); *G06T 2207/10052* (2013.01); *H04N 2209/045* (2013.01)

(56) References Cited

U.S. PATENT DOCUMENTS

| | | | |
|---|---|---|---|
| 2003/0234864 A1 | 12/2003 | Matherson et al. | |
| 2005/0046905 A1* | 3/2005 | Aizaki | G02B 21/365 358/296 |
| 2008/0173794 A1 | 7/2008 | Oike et al. | |
| 2009/0140131 A1* | 6/2009 | Utagawa | G02B 3/0056 250/226 |
| 2013/0022652 A1 | 1/2013 | Andersen et al. | |
| 2013/0222652 A1 | 8/2013 | Akeley et al. | |
| 2013/0335788 A1* | 12/2013 | Utsunomiya | H04N 1/00801 358/474 |
| 2015/0070537 A1 | 3/2015 | Bai et al. | |
| 2015/0130907 A1 | 5/2015 | Kim et al. | |
| 2017/0289512 A1* | 10/2017 | Bai | H04N 9/735 |

OTHER PUBLICATIONS

Seifi et al., "Disparity-Guided Demosaicking of Light Field Images", 2014 IEEE International Conference on Image Processing (ICIP), Paris, France, Oct. 27, 2014, pp. 1-5.

Sabater et al., "Accurate Disparity Estimation for Plenoptic Images", European Conference on Computer Vision, Zurich, Switzerland, Sep. 6, 2014, pp, 548-560.

Drazic et al., "Plenoptic Camera and Method of Controlling the Same", European Patent Application 15305988.6, Jun. 25, 2015, pp. 1-24.

Borel et al., "Plenoptic Camera Comprising an Anti-Vignetting Optical Filter and Method of Controlling the Same", European Patent Application 15306059.5, Jun. 30, 2015, pp. 1-29.

Drazic et al., "Light Field Imaging Device", European Patent Application 15305870.6, Jun. 8, 2014, pp. 1-20.

ISR for EP15307003, dated Jun. 17, 2016 and Sep. 22, 2016, respectively, pp. 1-7.

* cited by examiner

Table 1

|    | 0 | 1  | 2  | 3   | 4   | 5   | 6   | 7   | 8  | 9  | 10 |
|----|---|----|----|-----|-----|-----|-----|-----|----|----|----|
| 0  | 0 | 0  | 1  | 3   | 5   | 6   | 5   | 3   | 1  | 0  | 0  |
| 1  | 0 | 2  | 6  | 12  | 19  | 22  | 19  | 12  | 6  | 2  | 0  |
| 2  | 1 | 6  | 16 | 34  | 52  | 60  | 52  | 34  | 16 | 6  | 1  |
| 3  | 3 | 12 | 34 | 70  | 107 | 124 | 107 | 70  | 34 | 12 | 3  |
| 4  | 5 | 19 | 52 | 107 | 165 | 190 | 165 | 107 | 52 | 19 | 5  |
| 5  | 6 | 22 | 60 | 124 | 190 | 220 | 190 | 124 | 60 | 22 | 6  |
| 6  | 5 | 19 | 52 | 107 | 165 | 190 | 165 | 107 | 52 | 19 | 5  |
| 7  | 3 | 12 | 34 | 70  | 107 | 124 | 107 | 70  | 34 | 12 | 3  |
| 8  | 1 | 6  | 16 | 34  | 52  | 60  | 52  | 34  | 16 | 6  | 1  |
| 9  | 0 | 2  | 6  | 12  | 19  | 22  | 19  | 12  | 6  | 2  | 0  |
| 10 | 0 | 0  | 1  | 3   | 5   | 6   | 5   | 3   | 1  | 0  | 0  |

Fig. 12A

Table 2

|    | 0   | 1    | 2    | 3    | 4     | 5     | 6     | 7     | 8    | 9    | 10  |
|----|-----|------|------|------|-------|-------|-------|-------|------|------|-----|
| 0  | 0.0 | 0.0  | 1.2  | 3.5  | 5.8   | 7.0   | 5.8   | 3.5   | 1.2  | 0.0  | 0.0 |
| 1  | 0.0 | 2.3  | 7.0  | 13.9 | 22.0  | 25.5  | 22.0  | 13.9  | 7.0  | 2.3  | 0.0 |
| 2  | 1.2 | 7.0  | 18.5 | 39.4 | 60.3  | 69.5  | 60.3  | 39.4  | 18.5 | 7.0  | 1.2 |
| 3  | 3.5 | 13.9 | 39.4 | 81.1 | 124.0 | 143.7 | 124.0 | 81.1  | 39.4 | 13.9 | 3.5 |
| 4  | 5.8 | 22.0 | 60.3 | 124.0| 191.3 | 220.2 | 191.3 | 124.0 | 60.3 | 22.0 | 5.8 |
| 5  | 7.0 | 25.5 | 69.5 | 143.7| 220.2 | 255.0 | 220.2 | 143.7 | 69.5 | 25.5 | 7.0 |
| 6  | 5.8 | 22.0 | 60.3 | 124.0| 191.3 | 220.2 | 191.3 | 124.0 | 60.3 | 22.0 | 5.8 |
| 7  | 3.5 | 13.9 | 39.4 | 81.1 | 124.0 | 143.7 | 124.0 | 81.1  | 39.4 | 13.9 | 3.5 |
| 8  | 1.2 | 7.0  | 18.5 | 39.4 | 60.3  | 69.5  | 60.3  | 39.4  | 18.5 | 7.0  | 1.2 |
| 9  | 0.0 | 2.3  | 7.0  | 13.9 | 22.0  | 25.5  | 22.0  | 13.9  | 7.0  | 2.3  | 0.0 |
| 10 | 0.0 | 0.0  | 1.2  | 3.5  | 5.8   | 7.0   | 5.8   | 3.5   | 1.2  | 0.0  | 0.0 |

Fig. 12B

Table 3

|    | 0     | 1     | 2     | 3     | 4     | 5     | 6     | 7     | 8     | 9     | 10    |
|----|-------|-------|-------|-------|-------|-------|-------|-------|-------|-------|-------|
| 0  | 1.000 | 1.000 | 1.000 | 1.000 | 1.000 | 1.000 | 1.000 | 1.000 | 1.000 | 1.000 | 1.000 |
| 1  | 1.000 | 1.000 | 1.000 | 1.000 | 1.000 | 1.000 | 1.000 | 1.000 | 1.000 | 1.000 | 1.000 |
| 2  | 1.000 | 1.000 | 1.000 | 1.000 | 1.000 | 0.980 | 1.000 | 1.000 | 1.000 | 1.000 | 1.000 |
| 3  | 1.000 | 1.000 | 0.634 | 0.634 | 0.415 | 0.359 | 0.415 | 0.634 | 0.634 | 1.000 | 1.000 |
| 4  | 1.000 | 1.000 | 0.415 | 0.308 | 0.202 | 0.174 | 0.202 | 0.308 | 0.415 | 1.000 | 1.000 |
| 5  | 1.000 | 0.980 | 0.359 | 0.202 | 0.131 | 0.114 | 0.131 | 0.202 | 0.359 | 0.980 | 1.000 |
| 6  | 1.000 | 1.000 | 0.415 | 0.174 | 0.114 | 0.098 | 0.114 | 0.174 | 0.415 | 1.000 | 1.000 |
| 7  | 1.000 | 1.000 | 0.634 | 0.202 | 0.131 | 0.114 | 0.131 | 0.202 | 0.359 | 1.000 | 1.000 |
| 8  | 1.000 | 1.000 | 1.000 | 0.308 | 0.202 | 0.174 | 0.202 | 0.308 | 0.634 | 1.000 | 1.000 |
| 9  | 1.000 | 1.000 | 1.000 | 0.634 | 0.415 | 0.359 | 0.415 | 0.634 | 1.000 | 1.000 | 1.000 |
| 10 | 1.000 | 1.000 | 1.000 | 1.000 | 1.000 | 0.980 | 1.000 | 1.000 | 1.000 | 1.000 | 1.000 |

Fig. 12C

METHOD AND APPARATUS FOR CORRECTING VIGNETTING EFFECT CAUSED ON AN IMAGE CAPTURED BY LIGHTFIELD CAMERAS

CROSS-REFERENCE

This application claims the benefit under 35 U.S.C. § 119 of European Patent Application No. 15307003.2, filed Dec. 15, 2015, herein incorporated by reference.

TECHNICAL FIELD

The present disclosure generally relates to the field of multiple views imaging, notably multiple lightfields using lightfield cameras.

BACKGROUND ART

Lightfield cameras are able to measure the amount of light traveling along each ray bundle that intersects the image sensor by using a micro lens array that is placed between the main lens and the image sensor. This light field is then post-processed to reconstruct images of the scene from different points of view. The light field also permits a user to change the focal point of the images.

FIG. 1 shows illustrative configuration of a lightfield camera. The lightfield camera 1 comprises a lens arrangement associated with an image sensor array 13. The image sensor array 13 comprises a large number p of photosites 131, 132, 133 to 13p arranged in the form of a grid of X columns and Y lines, n being a number of elements corresponding to X times Y. A color filter array 12 is arranged on the image sensor array 13. The color filter array 12 typically arranges RGB (Red, Green and Blue) color filters on the image sensor array 13, the RGB arrangement can be, for example, the form of a Bayer filter mosaic. The lens arrangement comprises a primary lens 10, also called main lens, and a lenslet array 11 which comprises a plurality of m microlenses 111, 112, 11m, m being a positive integer. The microlenses 111, 112, 11m are arranged in such a way as to each be optically associated with a plurality of photosites 131, 132, 133 to 13p. The number of photosites 131, 132, 133 to 13p are optically associated with one microlens that corresponds to the number of views of the scene acquired with the lightfield camera. To obtain the different views, the raw image (i.e. the color sensor data acquired with the image sensor array 13) is demosaicked then de-multiplexed. After the demosaicking step, RGB image data values are obtained at each photosite location for each view.

The captured images of the scene with a lightfield camera should undergo view demultiplexing, i.e., the data conversion from the 2D raw image to the 4D light-field. The demultiplexing process consists of reorganizing the photosites of the raw image in such a way that all photosites 131 capturing the light rays with a certain angle of incidence are stored in the same image creating sub-aperture views. Each sub-aperture view is a projection of the scene under a different angle. The set of sub-aperture views create a block matrix where the central sub-aperture view stores the photosites capturing the light rays that pass through the central section of the main lens. In fact, the angular information of the light rays is provided by the relative photosites positions in the microlens images in respect to the microlens image centers.

One of the drawbacks in the use of lightfield cameras is the vignetting effects that cause darker views (due to the less luminance values) in peripheral sub-aperture views.

FIG. 1 illustrates such a drawback of a lightfield camera due to less refracted light energy in peripheral sub-aperture views. The dashed line represents light rays which have less refracted light energy due to vignetting effect.

Due to the optical imperfection of the main lens, higher incidence angles bring less refracted light energy. In a 2D mode, the result is a brightness non-uniformity of the image, where corners are darker than the center. In lightfield camera, peripheral sub-aperture views are unusable since they are too dark compared to central sub-aperture views. As illustrated in FIG. 1, peripheral sub-aperture view 102 (with the collection of peripheral positioning photosites 131 and 133 with respect to the center of microlens images) is not usable since it is too dark, mostly because view 102 is under exposed and therefore noisy. On the other hand central sub-aperture view 101 with the collection of central positioning photosites 132 that captured the light ray passing through the main lens center to the photosite 132 is usable since view 101 is better-exposed and less noisy.

FIG. 2 shows an enlargement view of image sensor array 13 depicted in FIG. 1. Central photosites 132 capture the light ray that has passed through the center of the main lens to central photosites 132 while peripheral photosites 131 and 133 capture light rays incoming with oblique angle compared with the central photosites 132, the luminance level of peripheral photosite 131 and 133 is less due to several reasons. Firstly, the light ray incoming with oblique angle has a longer way to travel to the image corner. Secondly, the pupil seen by the off-axis point is not round but elliptical and has a smaller area than the round pupil seen by the central photosites 132. Thirdly, while the light hits the image center at normal incidence, the light strikes the image corner at the angle b. The combined effect of all cosine factors is a $\cos^4$law (cosine forth law) luminance falloff towards the image corners.

FIG. 3 shows an image of white signal in the central part of a sensor from image array 13. In this image, the vignetting effect nearly follows a symmetric $\cos^4$law (cosine forth law) fall-off. For the photosites of the central microlenses, the vignetting effect can be formulated by a $\cos^4$law (cosine forth law) factor or a Gaussian fall-off function, for example.

Although the fall off can be simulated with the cos 4 law or any other fall off calculations, those fall offs are merely theoretical fall off calculations. Therefore, a calibration step may be used to more accurately estimate the light fall off in peripheral photosites.

Also, apart from the signal amplitude problems, these vignetting effects lead also to color artifacts when applying content-aware demosaicking methods.

According to a referenced document, 20 Mar. 2015, N. Sabater, M. Seifi, V. Drazic, G. Sandri, and P. Perez, "Accurate Disparity Estimation for Plenoptic Images," http://link.springer.com/article/10.1007%2F978-3-319-16181-5_42/lookinside/000.png the difference of the luminance level (between the center and the periphery) may be reduced using a weighting matrix derived by dividing the raw data by a corresponding white image (i.e., the image of a Lambertian light-emitting type object).

In above referenced document, it is explained that considering the white image as a weighting matrix is computationally more efficient than mathematically modeling the vignetting on every microlens. Mathematically modeling the vignetting effect on every microlens is impractical due to the lack of the precise knowledge of the camera's intrinsic parameters or about the design of each lens. Some problems with the proposed solution of the referenced document is that a Lambertian light-emitting type object image needs to be captured in order to calculate the weighting matrix whenever the camera parameters (zoom/focus) are changed because the position of the microlens images on the photosites depends on the camera parameters, e.g., zoom and focus of the camera. That is, capturing Lambertian light-emitting type object images for the purposes of calculating the weighting matrix whenever the camera parameters (zoom/focus) are changed is impractical.

Additionally, reference document EP15306059.5 discloses a way to solve vignetting problem by introducing a gradient filter between the primary lens and the photosites set at the location of the stop aperture. The drawback of this approach is that it still needs Lambertian light-emitting type object image to be captured whenever changing the focus/zoom of the camera in order to estimate the position of the microlens images on the photosites.

SUMMARY

The present disclosure proposes a novel method and apparatus to overcome vignetting effect caused an image captured by lightfield cameras, also called plenoptic cameras.

According to the present principles, a method for correcting vignetting effect caused on an image captured by a lightfield camera comprising an image sensor array including plurality of photosites is disclosed. The method includes: obtaining luminance values from the each photosite; obtaining a set of weight values for compensating the vignetting effect for the each photosite, wherein said a set of weight value is associated with a present setting of the lightfield camera; and changing the luminance values of the each photosite based on the obtained set of the weight values.

The present principles also relate to a method for correcting vignetting effect caused on an image captured by a lightfield camera comprising image sensor array including plurality of photosites, a primary lens, microlenses located between the image sensor array and the primary lens, and an additional lens being arranged between the primary lens and the microlenses at a distance from the primary lens, the additional lens having a focal length corresponding to the distance. The method includes: obtaining luminance values of each photosite; obtaining a set of weight values for compensating the vignetting effect for the each photosite; and changing the luminance values of the each photosite based on the obtained set of weight values.

The present principles also relate to a device for correcting vignetting effect caused on an image captured by a lightfield camera comprising image sensor array including plurality of photosites, a primary lens, and microlenses located between the image sensor array the primary lens, wherein the device comprises a storage element storing sets of weight values for compensating the vignetting effect for the each photosite being associated with respective settings of the lightfield camera and a processor can communicate with the image sensor array and the storage. The processor is configured to perform: obtaining luminance values of each photosite; obtaining a set of weight values for each photosite being associated with a present setting of the lightfield camera; and changing the luminance values of each photosite based on the obtained set of the weight values.

The present principles also relate to a device for correcting vignetting effect caused on an image captured by a lightfield camera comprising image sensor array including plurality of photosites, a storage storing a set of weight values for compensating the vignetting effect for each photosite and a processor. The processor is configured to perform: obtaining luminance values of each photosite captured with a lightfield camera; obtaining a set of weight values for the each photosite; and changing a the luminance values of the each photosite based on the obtained a set of weight values.

The present principles also relate to a lightfield camera comprising: a primary lens; microlenses; an image sensor array including a plurality of photosites; wherein the photosites have respective sensitivities adjusted for compensating a vignetting effect to be caused on an image to be captured by the lightfield camera.

The present principles also relate to a method for manufacturing an image sensor array including a plurality of photosites for a lightfield camera using the other lightfield camera comprising the same configuration as the lightfield camera except for photosites of the other lightfield camera having homogeneous sensitivities. The method comprising: capturing a Lambertian object image with the other lightfield camera; calculating a set of weight values for compensating a vignetting effect caused on the Lambertian object image for the each photosite of the other lightfield camera based on the captured Lambertian object image; manufacturing the image sensor array including the photosites having respective sensitivities adjusted in accordance with the calculated the set of weight values; wherein the respective weight values are associated with both of the respective photosites of the lightfield camera and respective photosites of the other lightfield camera.

The present principles also disclose a method for manufacturing an image sensor array including a plurality of photosites for a lightfield camera comprising a primary lens, a lenslet array including a plurality of microlenses, and an additional lens being arranged between the primary lens and the microlenses at a distance from the primary lens, the additional lens having a focal length corresponding to the distance, the image sensor array including a plurality of photosites, using the other lightfield camera comprising the same configuration as the lightfield camera except for photosites of the other lightfield camera having a homogeneous sensitivities. The method comprising: capturing a Lambertian object image with the other lightfield camera; calculating a set of weight values for compensating a vignetting effect caused on the Lambertian object image for the each photosite of the other lightfield camera based on the captured Lambertian object image; manufacturing the image sensor array including the photosites having respective sensitivities adjusted in accordance with the calculated the set of weight values; wherein the respective weight values are associated with both of the respective photosites of the lightfield camera and respective photosites of the other lightfield camera.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 12 A to C show different illustrative configurations of luminance values as it relates to FIG. 12.

DESCRIPTION OF EMBODIMENTS

It is expected that present disclosure can be implemented by one of the ordinary skill in the art whereby some of the elements shown in the figures will not be described in detail. For example, a device that is processor-based such as a mobile phone, table, digital still camera, laptop computer, desk top computer, digital television, etc., will not need to be described in detail. It should also be noted that presented disclosure may be implemented using programming techniques, e.g., APIs (application programming interfaces) which, as such, will not be described herein. Finally, the like-numbers on the figures represent similar elements. It should also be noted that although color processing is referred to below, the figures are in black and white, i.e., the use of color in the figures (other than black and white) is not necessary to understand the presented concepts.

Figure 4:
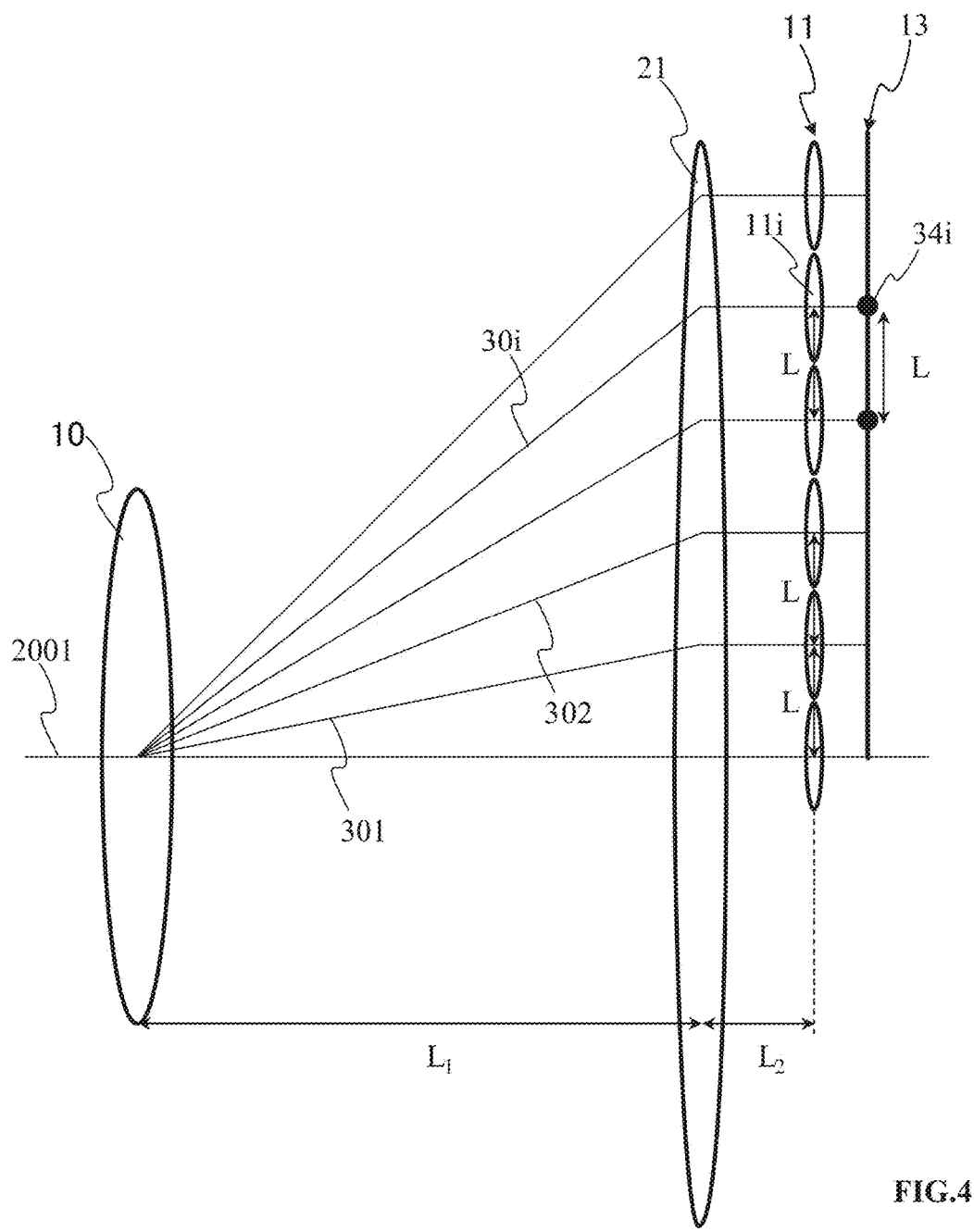
FIG. 4 shows an illustrative configuration of a lightfield camera with an additional lens according to an embodiment of present disclosure.

FIG. 4 shows an illustrative configuration of lightfield camera with an additional lens according to an embodiment of present disclosure. One of the technical reference documents, EPI 5305988.6, discloses the concept of placing an additional lens 21 between the primary lens 10 and the lenslet array 11 so that the position of the microlens images does not depend on zoom/focus of the camera. Additional lens 21 is arranged between the primary lens 10 and the lenslet array 11, at a fixed position, e.g. during the manufacturing of the lightfield camera 1 or after the lightfield camera 1 is manufactured, additional lens 21 is displaced or added, at a distance L1 from the primary lens 10 and at a distance L2 from the lenslet array 11. The focal length of the additional lens 21 is equal to a value corresponding to the distance L1 between the primary lens 10 and the additional lens 21.

Additional lens 21 contributes to estimate one set of micro-image centers for every set of focusing-distance/zoom parameters of the lightfield camera 1. In other words, with this solution, the centers of micro-images can be estimated even with different zooming or focalization settings.

As the focal length of the additional lens 21 is equal to the distance L1, the chief rays of light 301, 302 and 30$i$ passing through the centers of the microlenses 110, 11$i$ are parallel to the optical axis 2001 of the lightfield camera 1, i.e. the rays of light that get out the additional lens and pass through the centers of the microlenses of the lenslet array 11 are parallel to the optical axis 2001 of the lightfield camera 1. Setting the focal length of the additional lens 21 to the distance L1 enables a constant distance between the centers of the micro-images formed under the lenslet array 11 on the image sensor array 13. The distance between the centers of two adjacent micro-images is equal to the distance, referenced L, between the centers of the corresponding lenslet array 11. A regular arrangement of the centers of the micro-images on the image sensor array 13 helps when determining such centers when calibrating the lightfield camera 1. Moreover, as the focal length of the additional lens 21 is controlled to be equal to L1 even when the distance L1 varies (for example when zooming or focusing), the locations of the centers of the micro-images on the image sensor array 13 do not vary. Using such techniques helps avoid the determining of the centers of the micro-images each and every time the zooming and/or focusing parameters of the primary lens 10 change. By taking the example of the i-th microlens 11$i$, the ray of light 30$i$ is parallel to the optical axis 2001 when outputted from the additional lens 21 and the point hit by this ray 30$i$ is the center 34$i$ of the micro-image formed under the microlens 30$i$, the same point being hit by the ray 30$i$, whatever the focusing distance and/or zooming parameter of the primary lens 10, i.e. whatever the value of the distance L1.

By using additional lens 21, the centers of micro-image can be captured in the same location on the sensor array 13 regardless of the zooming or focalization setting so that changing the sensitivity of photosites will be more effective to solve the technical problem stated in the Background section.

In one of the exemplary embodiment of present disclosure, a calculation for the required photosites sensitivity is performed with having additional lens 21 as shown in FIG. 4. In some exemplary embodiments, the installation of additional lens 21 may not be required for a calculation of required photosite sensitivity as long as a lightfield camera 1 is a single-focus camera (in other words, if a lightfield camera 1 does not have a functionality of zoom/focus settings, additional lens 21 may not be required.) or when there is a mean associating a set of weight values to a respective zoom/focus settings.

In one of the exemplary embodiment of present disclosure, calibration steps are performed by capturing uniformly illuminated white object which radiates light equally in all direction (Herein after, it is referred as "Lambertian object"). It is anticipated that such Lambertian object image to be captured should be uniformly white, however an image to be captured is actually not uniformly white due to the vignetting and color filter effect. The RGB (Red, Green and Blue)

color filters that are arranged on the image sensor array 13 give an effect on luminance level where the effect of color filter should be compensated.

At the same time, there are some photosites 131, 132, 133 to 13*p* of those luminance levels are less than the threshold for mechanical cat's eye vignetting (Hereinafter, refer to "min_threshold") due to the mechanical cat's eye vignetting.

Figure 5:
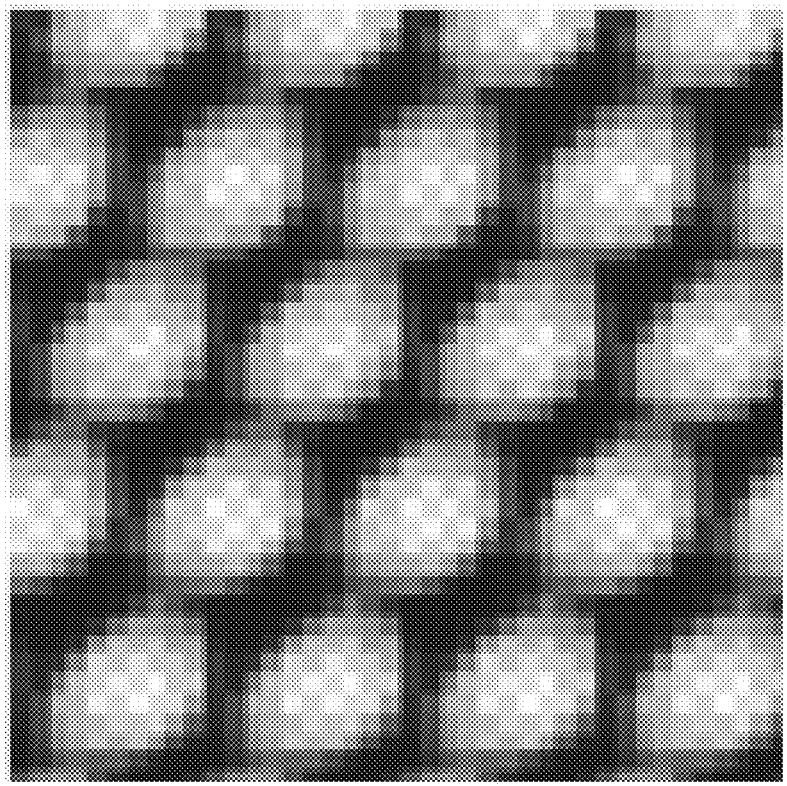
FIG. 5 shows vignetting and color filter effects on the periphery of a sensor array.

FIG. 5 shows the vignetting and color filter effects caused on the periphery of the sensor array.

Some of the photosites in the periphery and away from the center of the sensor never receive any usable light in cases due to the mechanical cat's eye vignetting. Therefore, in a present disclosure, a min_threshold is preset in order to distinguish between photosites that will be compensated for vignetting fall off effects and photosites that will not be compensated. Some photosites will be in the "shadow" (in other words, such photosites will not receive light) due to the front lens aperture, rear lens aperture and diaphragm aperture. A min_threshold can be chosen to decide whether the photosites ever receive light due to the mechanical cat's eye vignetting. An example of a min_threshold is 0.1 out of 1. In the present disclosure, those photosites of luminance values that are less than min_threshold will not be compensated, since those photosites are determined as not receiving usable lights due to mechanical cat's eye vignetting.

In another embodiment of the present disclosure, the luminance values of each photosite can be multiplied (or reduced) or the sensitivities of the each photosite can also be designed to correct the effect of color filters that are used to sample the color content. For example, a photosite behind a blue color filter can be designed more sensitive to capture the same value as the photosite placed behind a green color filter in response to an ideal white signal. The detailed steps are explained later in this part of this description.

Figure 6:
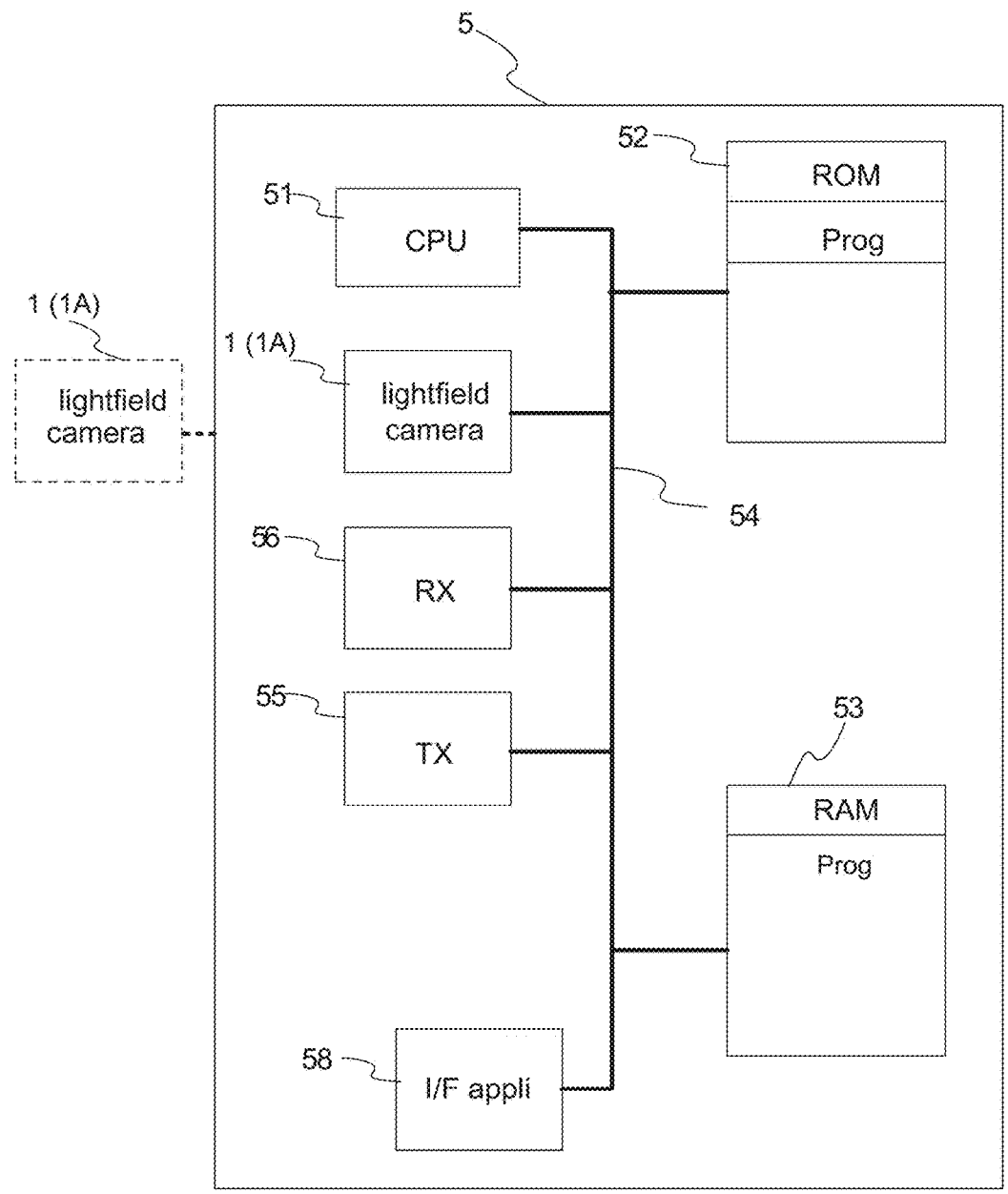
FIG. 6 is a diagram illustrating hardware configuration of a device which embodies a lightfield camera according to an embodiment of present disclosure.

FIG. 6 is a diagram illustrating hardware configuration of a device which discloses various embodiment of present disclosure. Although it is depicted in FIG. 6 that a device 5 includes lightfield camera 1 (or 1A that will be explained in later section of this description), a lightfield camera 1 can be configured separately from a device 5. A device 5 can be any device such as, for example, desktop or personal computers, smartphones, smartwatches, tablets, mobile phones, portable/personal digital assistants ("PDAs"), and other devices that facilitate communication of information between end-users and a lightfield camera 1. Lightfield camera 1 can also have equivalent hardware configuration of a device 5 inside.

The device 5 comprises the following elements, which are connected to each other by a bus 54 of addresses and data that also transports a clock signal: a processor 51 (or CPU), a non-volatile memory of ROM (Read Only Memory) type 52, a Random Access Memory or RAM 53, a radio interface (RX) 56, an interface 55 (TX) adapted for the transmission of data, a lightfield camera 1, an MMI (Man Machine Interface) 58 (I/F appli) adapted for displaying information for a user and/or inputting data or parameters.

It is noted that the term "register" or "store" used in the description of memories 52 and 53 designates in each of the memories mentioned, a memory zone of a low capacity as well as a memory zone of a large capacity (enabling a whole program to be stored in such memories or all or part of the data representing data received and decoded for such memories).

The ROM 52 comprises a program "prog". The algorithms implementing the steps of the method specific to the present disclosure and described below are stored in the ROM 52 memory and are associated with the device 5 implementing these steps. When powered up, the processor 51 loads and runs the instructions of these algorithms.

The RAM 53 notably comprises in a register and/or memory, the operating program of the processor 51 responsible for switching on the device 5, reception parameters (for example parameters for modulation, encoding, MIMO (Multiple Input Multiple Output), recurrence of frames), transmission parameters (for example parameters for modulation, encoding, MIMO, recurrence of frames), incoming data corresponding to the data received and decoded by the radio interface 56, decoded data formed to be transmitted at the interface to the application 58, parameters of the primary lens 10 and/or information representative of the centers of the micro-images formed by the microlenses of the microlens array.

Other structures of the device 5, than those described with respect to FIG. 6, are compatible with the present disclosure. In particular, according to various alternative embodiments, the device 5 may be implemented according to a purely hardware realization, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 56 and the interface 55 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth).

According to an alternative embodiment, the device 5 does not include any ROM but only RAM where the algorithms implementing the steps of the method specific to the present disclosure are stored in the RAM.

Figure 7:
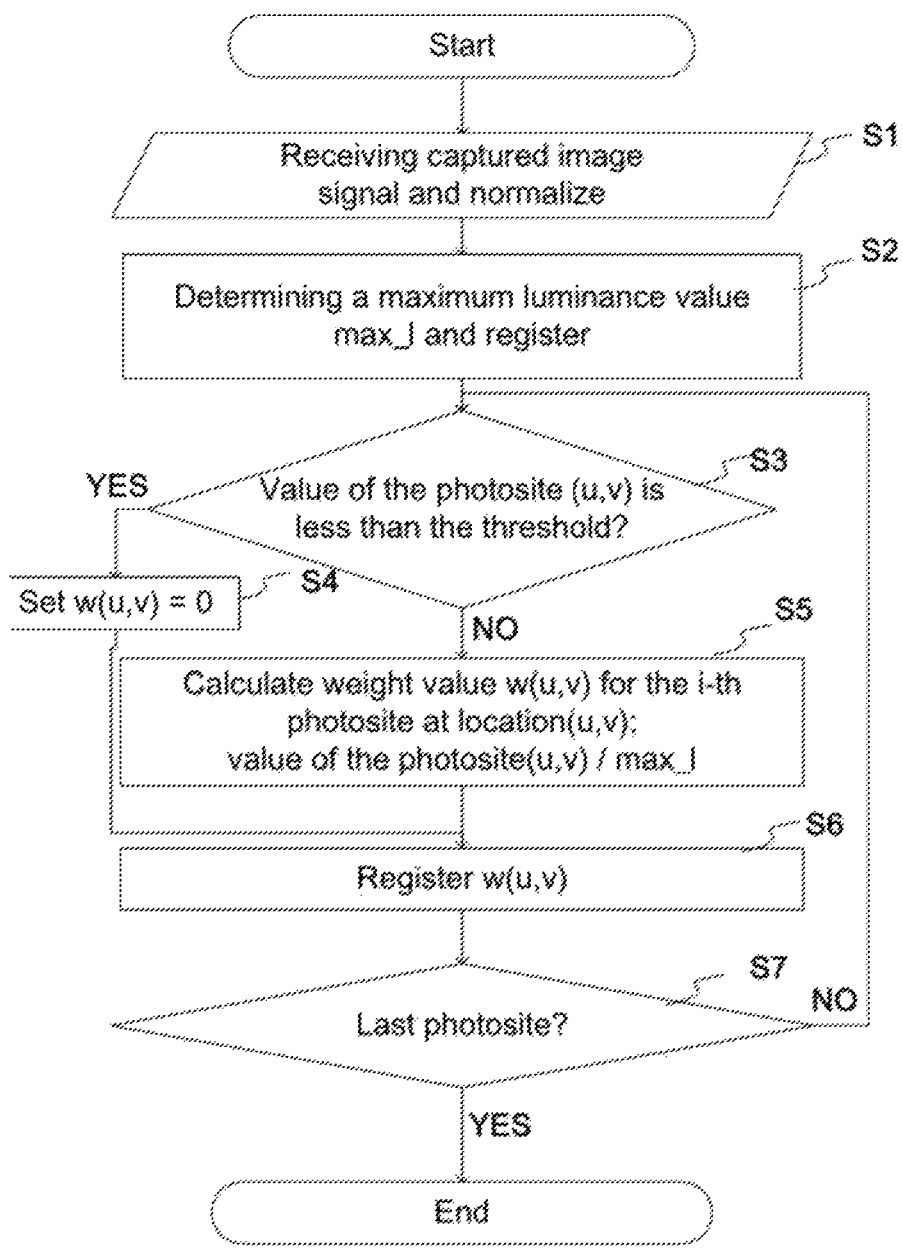
FIG. 7 shows an illustrative flow chart for calculating a set of weight values for each photosite using lightfield camera according to an embodiment of present disclosure.

FIG. 7 shows an illustrative flow chart for calculating a set of weight values for each photosite using a lightfield camera according to an embodiment of present disclosure. A calculated weight value w(u,v) may be used to multiply the luminance value of the photosite at location (u,v). The steps described in this flowchart can be performed by a processor 51. In this exemplary flowchart, (u,v) refers to a coordinate of i-th photosite on a sensor array 13 plane. Each value for "u" and "v" will be incremented in accordance with the number i of the photosite to be processed is incremented at the step 7 (S7).

At Step 1 (S1), processor 51 receives luminance values of all photosite 131, 132, 133 to 13*p* when a lightfield camera 1 captures image of Lambertian object that uniformly radiates lights equally in all direction.

The luminance values may be computed with a weighted sum of color components. For instance, Luminance value may be computed with following equation.

$$l(u,v) = h\_red * q\_red + h\_green * q\_green + h\_blue * q\_blue.$$

For instance, Luminance $l(u,v) = ((q\_red \times 299) + (q\_green \times 587) + (q\_blue \times 114))/1000$;

Other techniques for calculating luminance values of photosites 131, 132, 133 to 13*p* can be employed in accordance with the principles of the present disclosure.

At step 1 (S1), processor 51 also normalizes luminance value of each photosite 131, 132, 133 to 13*p* so that the maximum value to be transformed to the maximum magnitude that photosites can provide.

For example, 255 for 8 bit sensor;

$$l'(u,v)=255*l(u,v)/\max\_l$$

wherein, l'(u,v) represents a normalized luminance value of photosite location at (u,v), l(u,v) represents luminance value of photosite location at (u,v) and max_l represents maximum luminance value among all the photosite 131, 132, 133 to 13*p*.

At step 2 (S2), a processor 51 determines and registers a normalized maximum luminance value. In one of the exemplary embodiment, a processor 51 may temporary register luminance values of all photosets to a memory such as RAM 53 or ROM 52 and may determine a maximum luminance value from registered all luminance values. A processor 51 registers a normalized maximum luminance value to a memory as well. A photosite 131, 132, 133 to 13*p* with the maximum luminance value is usually located close to the central part of sensor array 13.

Calculation of a set of weight values (a weight matrix) for each photosite 131, 132, 133 to 13*p* is performed in Steps 3 (S3) to 7 (S7).

As described in above, some of the photosites 131, 132, 133 to 13*p* in the periphery of a sensor array 13 and away from the center of the sensor array 13 may never receive any usable light in some cases due to the mechanical cat's eye vignetting. Therefore in the present disclosure, a min_threshold is prepared and determined. The system in present disclosure regards the photosites 131, 132, 133 to 13*p* of those luminance values as being less than a threshold are affected due to mechanical cat's eye vignetting and set weight values for those photosites 131, 132, 133 to 13*p* are equal to 0.

In step 3 (S3), processor 51 determines whether the luminance value l'(u,v) of an i-th photosite 131, 132, 133 to 13*p* is less than a min_threshold. If it is determined that luminance value of i-th photosite l'(u,v) is less than the min_threshold value, a process proceeds to step 4 (S4). If it is determined that the value l'(u,v) is greater than or equal to the min_threshold, a process proceeds to step 5 (S5).

This can include calculating weight value w(u,v) for the i-th photosite at location 9U,v) which can also have value of photosite (u,v)/max−1.

In step 4 (S4), if it is determined that the luminance value of this i-th photosite 131, 132, 133 to 13*p* is less than a threshold value, processor 51 sets a weight value for this photosite equal to 0.

In step 5 (S5), processor 51 calculates weight value for this i-th photosite 131, 132, 133 to 13*p*. Then, processor 51 reads the value max_l' from the memory and then calculates weight value for an i-th photosite w(u,v) by computing the ratio w(u,v)=max_l'/l'(u,v) which is a correction weight value for a photosite at location (u,v). In this example w(u,v) is used for correcting red, green and blue components.

Although a particular embodiment has been described herein, it will be appreciated that the computations for luminance value or computation for weight values are not limited thereto and that many modifications and additions thereto may be made within the scope of the present disclosure.

In step 6 (S6), processor 51 stores the calculated weight value for this i-th photosite to the memory (weight matrix storage 87). It should be noted that, in a case the additional lens 21 is not installed in the lightfield camera, the position of the microlens images on the sensor array 13 depends on the camera parameters, e.g., zoom and focus of the camera. In the case where the additional lens 21 is not installed, a set of calculated weight values should be registered to the memory associated with a present zoom/focus setting that is detected by the means not described in the attached figures. A weight value may be further associated with a location of the photosite (u,v) on a sensor array 13 plane in order to be applied to a luminance value of corresponding photosite (u,v) on a sensor array 13 plane. In other words, the weight value calculated for a location of photosite (u,v) on a sensor array 13 plane will be used to multiply the luminance value captured on the same location of photosite (u,v) on a sensor array 13 plane at the later explained step 114 (S114).

In step 7 (S7), processor 51 determines whether this is the last photosite in an array. One of the exemplary ways of determining whether a photosite is the last photosite or not is comparing a processing photosite number i with the maximum photosite number $i_{max}$ which is preregistered to the memory. For example, in case 100×100 in total 10000 photosite are arranged on a sensor array 13 plane, processor 51 will terminate the loop when a weight value for i=9999 (in case the "i" is integer from 0 to 9999) photosite is calculated. In the case, a photosite is not the last photosite, processor 51 increments the photosite number i and will go back to step 3 (S3). If this is determined that a photosite is the last photosite $i_{max}$, the process is terminated since a set of weight values (such as a set of weight values for 10000 photosites from i=0 to i=9999) is calculated.

In this flowchart, for enabling a reader to understand the present disclosure easily, photosite to be processed is expressed in the form of i-th. However, a person skilled in the art may understand that the different form of calculation can be used. For example, photosite to be processed can take the form of (u,v), then the process is terminated when the calculation for photosite at u=$u_{max}$ and v=$v_{max}$ (for example $u_{max}$=99 and $v_{max}$=99 for 100×100 sensor (in case the "u" and "v" are the integer from 0 to 99)) is completed.

Figure 8:
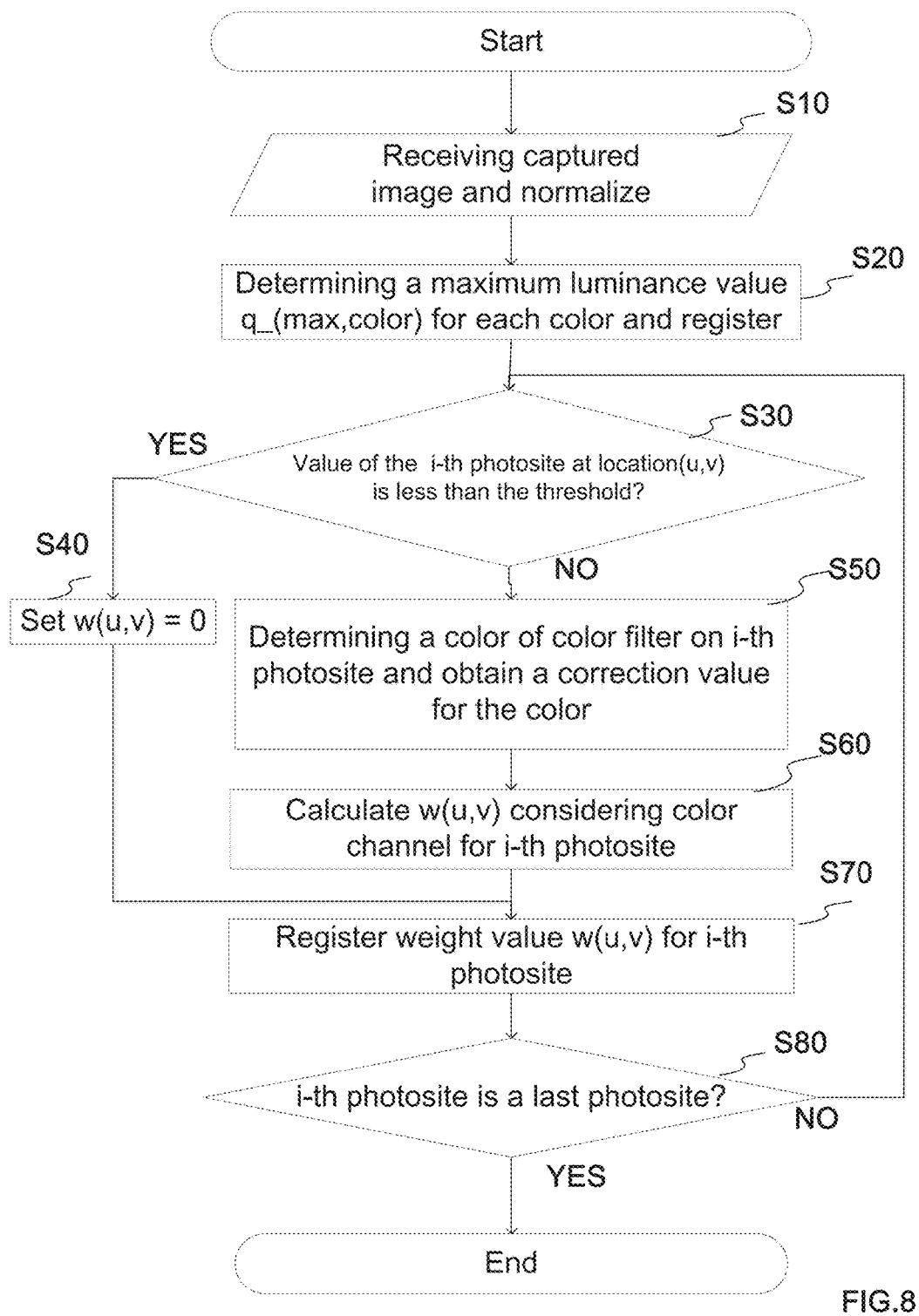
FIG. 8 shows an illustrative flow chart for calculating a set of weight values for each photosite based on the color channel according to alternative embodiment of present disclosure.

FIG. 8 shows an illustrative flow chart for alternative embodiment which calculates a set of weight values for each photosite based on the color channel. As is described above, depending color filter placed onto the each photosite 131, 132, 133 to 13*p*, a weight value should be varied since the effects brought by each color channel may differ. The entire method described in this flowchart is performed by processor 51. In this exemplary flowchart, (u,v) refers to a coordinate of i-th photosite on a plane of sensor array 13. Each value for "u" and "v" will be incremented in accordance with the number i of the photosite to be processed is incremented at the step 80 (S80). Needless to say, there is a mean to detect the color of color filters which corresponds to each photosite.

In Step 10 (S10), processor 51 receives luminance values of photosites 131, 132, 133 to 13*p* when a lightfield camera 1 captures image of Lambertian object that uniformly radiates lights equally in all direction. As stated in step 1 (S1) in FIG. 7, normalizing captured luminance value step is performed. As stated previously, l'(u,v), max_l' and q'(max, color) each represents normalized luminance values.

In step 20 (S20), processor 51 determines a maximum luminance value q'_(max,color) for each color which is comprised in color filter such as Bayer filter from the received signal (all luminance values). In one exemplary embodiment, processor 51 may temporary register luminance values of all the photosites 131, 132, 133 to 13*p* by associating respective colors of color filters placed onto the respective photosites 131, 132, 133 to 13*p*. For example, processor 51 may register a luminance value associating a color "red" for a photosite 131, 132, 133 to 13*p* on which red color filter is placed. Then processor 51 may locate the maximum luminance value per each color from registered all luminance values. Processor 51 may register respective maximum luminance value to a memory. For example, in the case where a color filter is comprised with red, green and blue, maximum luminance values (q'_(max·red), q'_(max·green), q'_(max·blue)) for each of the respective colors are determined. A photosite 131, 132, 133 to 13p with the maximum luminance value is usually located close to the central part of image sensor array 13.

Calculations for a set of weight values for each photosite are performed in step 30 (S30) to step 80 (S80). In step 30 (S30), processor 51 determines whether the luminance value of i-th photosite l'(u,v) is less than a min_threshold. If it is determined that a luminance value of l'(u,v) is less than the min_threshold value, the process proceeds to step 40 (S40). If it is determined that the value of l'(u,v) is greater than or equal to the min_threshold, the process proceeds to step 50 (S50).

In step 40 (S40), as it is determined that the luminance value of this i-th photosite is less than a threshold value, processor 51 determines that this i-th photosite won't receive light due to mechanical cat's eye vignetting. Processor 51 sets a weight value for this i-th photosite equal to 0.

In step 50 (S50) processor 51 determines the color of color filter on this i-th photosite and obtains a correction value for the color of the color filter on this photosite.

In step 60 (S60), processor 51 calculates a weight value for this i-th photosite, which, for example, can be determined with following formula:

$$w(u,v)=h\_color*q'\_(max,color)/l'(u,v)$$

l'(u,v) is a normalized luminance value measured on the photosite at a position (u,v) when a Lambertian object is captured by a lightfield camera 1. q'_(max,color) is the normalized maximum luminance value per color measured on the image sensor array 13 when a Lambertian object is captured by a lightfield camera 1. h_color is the predetermined correction value corresponding to the color (for example, red, green or blue) of color filter which is placed on the photosite.

For example, in the case where the color filter on i-th photosite at the coordinate (u,v) is red, the weight value is calculated with following formula:

$$w(u,v)=h\_color(red)*q'\_(max\text{-}red)*1/l'(u,v)$$

In step 70 (S70), processor 51 registers the calculated weight value for this i-th photosite. At this step, in the case where the additional lens 21 is not installed in the lightfield camera, a calculated a set of weight values may be registered to a memory in association with present zoom/focus setting.

In step 80 (S80), processor 51 determines whether this is the last photosite by comparing processing photosite number i with the maximum photosite number $i_{max}$ which may be preregistered to the memory. If a photosite is determined to be the last photosite, process is terminated. If it is determined that a photosite is not a last photosite to be calculated for a weight value, processor 51 increments the photosite number i and returns to step 30 (S30) to calculate the weight value for next photosite (i+1-th photosite).

In this flowchart, for enabling a reader to understand the present disclosure easily, photosite to be processed is expressed in the form of i-th. However, a person skilled in the art may understand that the different form of calculation can be used. For example, photosite to be processed can take the form of (u,v), then the process is terminated when the calculation for photosite at u=$u_{max}$ and v=$v_{max}$ (for example $u_{max}$=99 and $v_{max}$=99 for 100×100 sensor (in case the "u" and "v" are the integer from 0 to 99)) is completed.

First Embodiment

Figure 9:
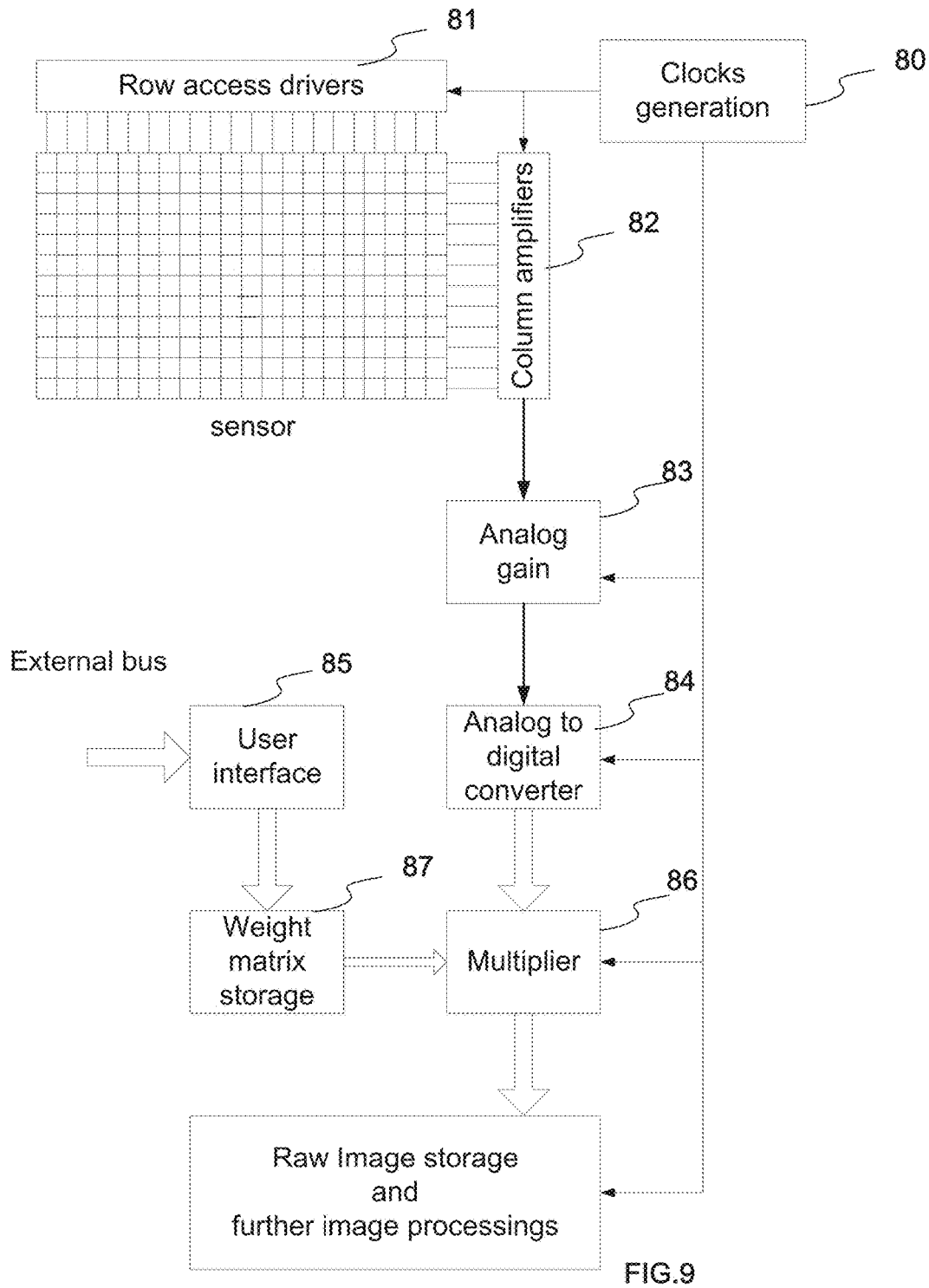
FIG. 9 shows illustrative a diagram of a configuration for applying calculated respective weight value to an output signal from each photosite according to an embodiment of present disclosure.

FIG. 9 shows an illustrative diagram of a configuration for applying calculated respective weight values to output signals from each photosite according to an embodiment of present disclosure. A calculated a set of weight values are applied to the luminance values of each photosite respectively in order to compensate the vignetting effect caused when an image is captured.

As is illustrated in FIG. 9, the signal captured by the image sensor array 13 is sent to the analog to digital conversion device 84 via row access drivers 81, column amplifiers 82 and analog gain 83. Clocks generation 80 regulates the rate at which instructions are executed. The sets of weight values are computed by processor 51 and registered into a weight matrix storage 87. After the captured signal is converted to a digital stream, signals from each photosite may be multiplied by the corresponding weight values at multiplier 86 in order to compensate the vignetting effects. Alternatively, signals from each photosite may be multiplied before being converted to a digital stream. In this implementation, there is no need to adjust the sensitivities of each photosite by changing a sizes or fill factors of each photosite. The vignetting effect is compensated after capturing an image in accordance with computed a set of weight values (weight matrix). Although a means for detecting a present setting (such as zoom/focus) of a lightfield camera 1 is not indicated in the attached figure, a lightfield camera 1 can be configured to have such a means.

In a variation of this embodiment, the sets of weight values stored at weight matrix storage 87 can be updated by a user. The user may download the sets of weight values (sets of weight matrix) from the source outside or acquiring the sets of weight values by using some of the calibration steps mentioned above and registers the acquired sets of weight values into weight matrix storage 87. This implementation can be useful for the cases with or without an additional lens 21. Even with an additional lens 21, there may be a several factors which modify vignetting effect. One of the cases is when the main lens is changed. This modifies the vignetting effect and therefore the weights need to be recalculated. Another case is bias or noise of camera modifies the vignetting effect. This bias appears as the time goes by (bias brought by temperature, mechanical changes, physical changes, or etc.). There are several other factors which modifies the vignetting effect where being able to change a set of weight values in accordance with the configurational change by a user would help compensate for these situations.

A set of weight values can be directly computed by capturing a Lambertian object with a given tuning of the optical setup, then computing a set of weight values with a above described algorithms we can then uploaded via the external interface. In this case, the use of an additional lens 21 may not be necessary since sets of weight values (weight matrix) are programmable in the camera. Unless a set of weight values are implemented in definitive hardware, users may calibrate the system when it is suitable (zoom/focus changing) using a Lambertian object. A set of weight values are computed in accordance with the algorithms described herein and then a set of weight values may be stored in the memory (weight matrix storage 87) associated with a setting of lightfield camera 1 at the time when Lambertian object is captured.

Figure 10:
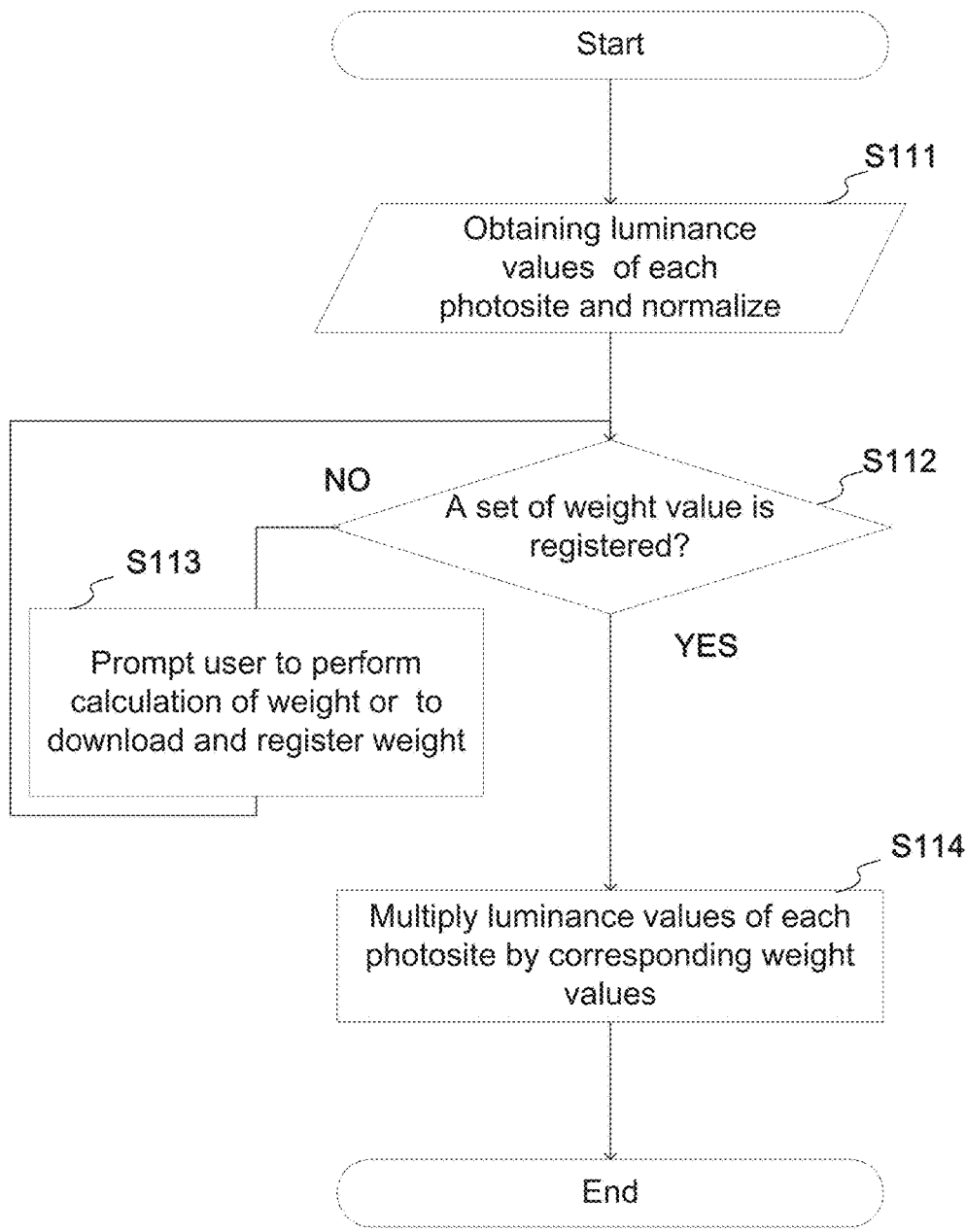
FIG. 10 shows an illustrative flow chart for applying calculated a set of weight values to a set of luminance values of each photosite according to an embodiment of present disclosure.

FIG. 10 shows an illustrative flow chart for applying a set of calculated weight values to a set of luminance values for each photosite according to an embodiment of present disclosure. The entire process described in this flowchart is performed by processor 51. In the following explanation, (u,v) refers to a coordinate of a photosite on a sensor array plane 13.

In step 111 (S111), processor 51 obtains luminance values from each photosite 131, 132, 133 to 13p captured with a lightfield camera 1 and is normalized.

In step 112 (S112), processor 51 accesses a storage (such as weight matrix storage 87) to obtain a set of weight values for the each photosite 131, 132, 133 to 13p, a set of weight values may be associated with present zoom/focus setting of lightfield camera 1. As explained above, lightfield camera 1 has a means to detect a present setting (such as zoom/focus) and a present setting is stored in a memory. If it is determined that a set of weight values associated with present zoom/focus setting is found in the storage (weight matrix storage 87), the process proceeds to step 114 (S114). If a set of weight values associated with a present zoom/focus setting is not found, the process proceeds to step 113 (S113). In a variant embodiment, additional lens 21 may be installed in the lightfield camera 1. In this case, a set of weight values does not have to be associated with respective zoom/focus settings since positions of a set of microlens images on the sensor array 13 is fixed.

In step 113 (S113), processor 51 prompts user to perform calculation of a set of weight values step described in FIG. 7 or FIG. 8, or prompts user to register a set of weight values associated with present zoom/focus setting. A set of weight values can be obtained from the outer source such as internet or manufacturer's site. The prompt can be performed any ways known in the art such as by showing a message or outputting audio message through a MMI (Man Machine Interface) 85.

In step 114 (S114), processor 51 multiplies luminance values from each photosite by the corresponding weight values. A calculated weight value w(u,v) may be used to multiply the luminance value of the photosite at location (u,v). By multiplying luminance values of each photosite by the corresponding weight values, the luminance values of each photosite that are affected due to the vignetting effect are increased. Eventually, vignetting effect caused on an image captured by lightfield camera 1 will be compensated.

Secondary Embodiment

The following secondary embodiment is related to adjusting sensitivities of each photosite with an additional hardware configuration.

Figure 1:
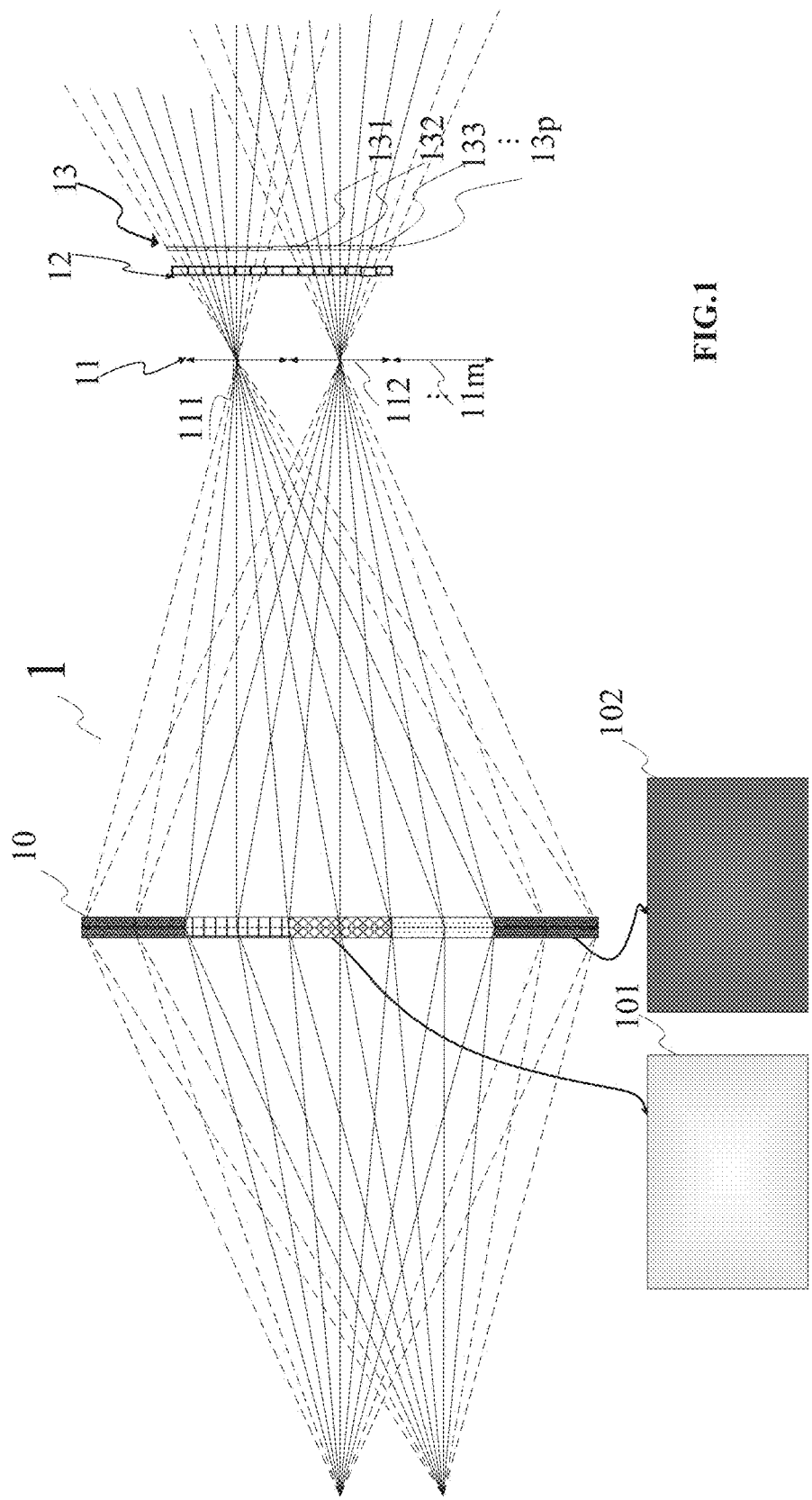
FIG. 1 shows illustrative configuration of a lightfield camera.
Figure 2:
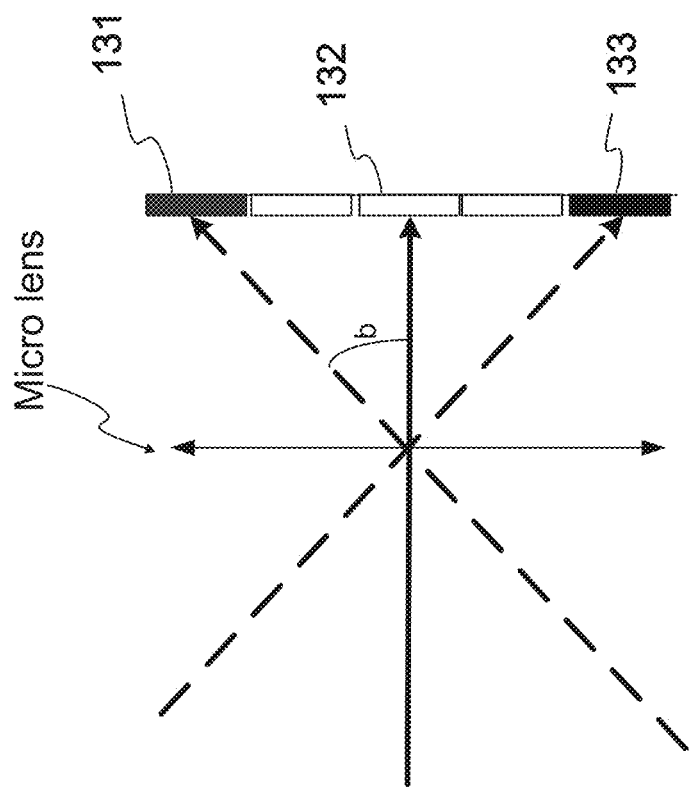
FIG. 2 shows an enlargement view of image sensor array depicted in FIG. 1.
Figure 3:
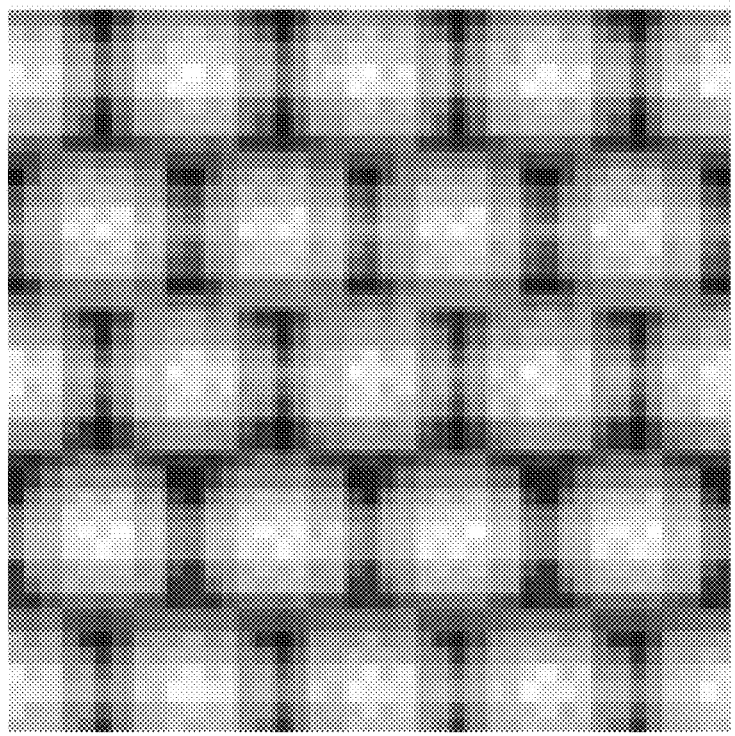
FIG. 3 shows an image of a white signal in the middle of a photosite from FIG. 1.
Figure 11:
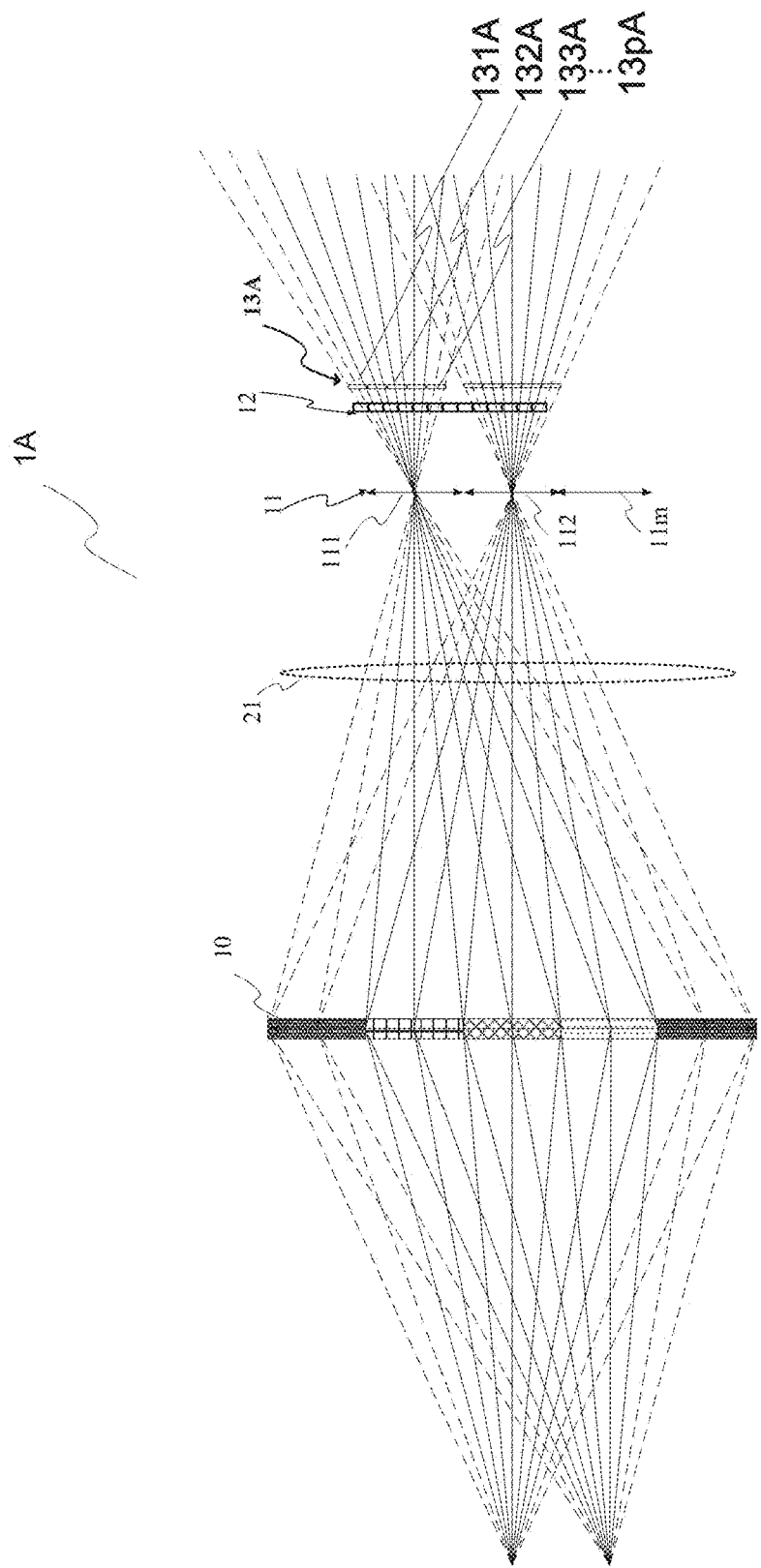
FIG. 11 shows illustrative configuration of a lightfield camera according to secondary embodiment of present disclosure.

FIG. 11 shows illustrative configuration of a lightfield camera according to secondary embodiment of present disclosure. The difference from the lightfield camera 1 depicted in FIG. 1 is an image sensor array 13A comprising photosites 131A, 132A, 133A to 13pA of those sensitivities are respectively adjusted. Other configurations can be almost the same as with the lightfield camera 1 depicted in FIG. 1. In a secondary embodiment, central photosites 132A which output relatively high luminance values will be designed to catch less photon by reducing the size of central photosite 132A or adjusting a fill factor of central photosite 132A by covering or hiding a surface of the photosite. In this embodiment, an additional lens 21 may be required to be installed in order to set a center of image always located in the same position regardless of the zoom/focus settings since the hardware configurations of each photosite 131A, 132A, 133A to 13 pA are changed. However the installation of additional lens 21 may not be required as long as a lightfield camera 1A is a single-focus camera (in other words, in the case where a lightfield camera 1A does not have a functionality of zoom/focus settings, additional lens 21 may not be required.)

In contrast to first embodiment which relates to computationally changing luminance values by multiplying luminance values of each photosite 131, 132, 133 to 13p by corresponding weight values, secondary embodiment relates to adjusting sensitivities of each photosite 131A, 132A, 133A to 13 pA by changing hardware configuration of each photosite 131A, 132A, 133A to 13 pA. In other words, secondary embodiment is related to level the luminance values of photosites 131A, 132A, 133A to 13 pA which aim to have the all the photosites 131A, 132A, 133A to 13 pA outputs relatively the same luminance values for the captured Lambertian object image. This may be achieved by decreasing the sensitivities of central photosites 132A which catches more photons compared with the peripheral photosites 131A and 133A or increasing the sensitivities of peripheral photosites 131A and 133A.

As stated above, the secondary implementation of present disclosure is related to design (adjust) the sensitivities of the each photosite 131A, 132A, 133A to 13 pA comprised in image sensor array 13A. Sensitivities of each photosite 131A, 132A, 133A to 13 pA are adjusted in consideration of the respective weight values. The number of photons to be caught on each photosite 131A, 132A, 133A to 13 pA may be proportional to the sizes or fill factors of each photosite 131A, 132A, 133A to 13 pA. In a manufacturing or pre-manufacturing phase, the calculation of a set of weight values to be described in this description is performed, and then the size or the fill factors of each photosite 131A, 132A, 133A to 13 pA may be designed (adjusted) in accordance with the calculated a set of weight values for photosites 131, 132, 133 to 13p and 131A, 132A, 133A to 13 pA.

Figure 12:
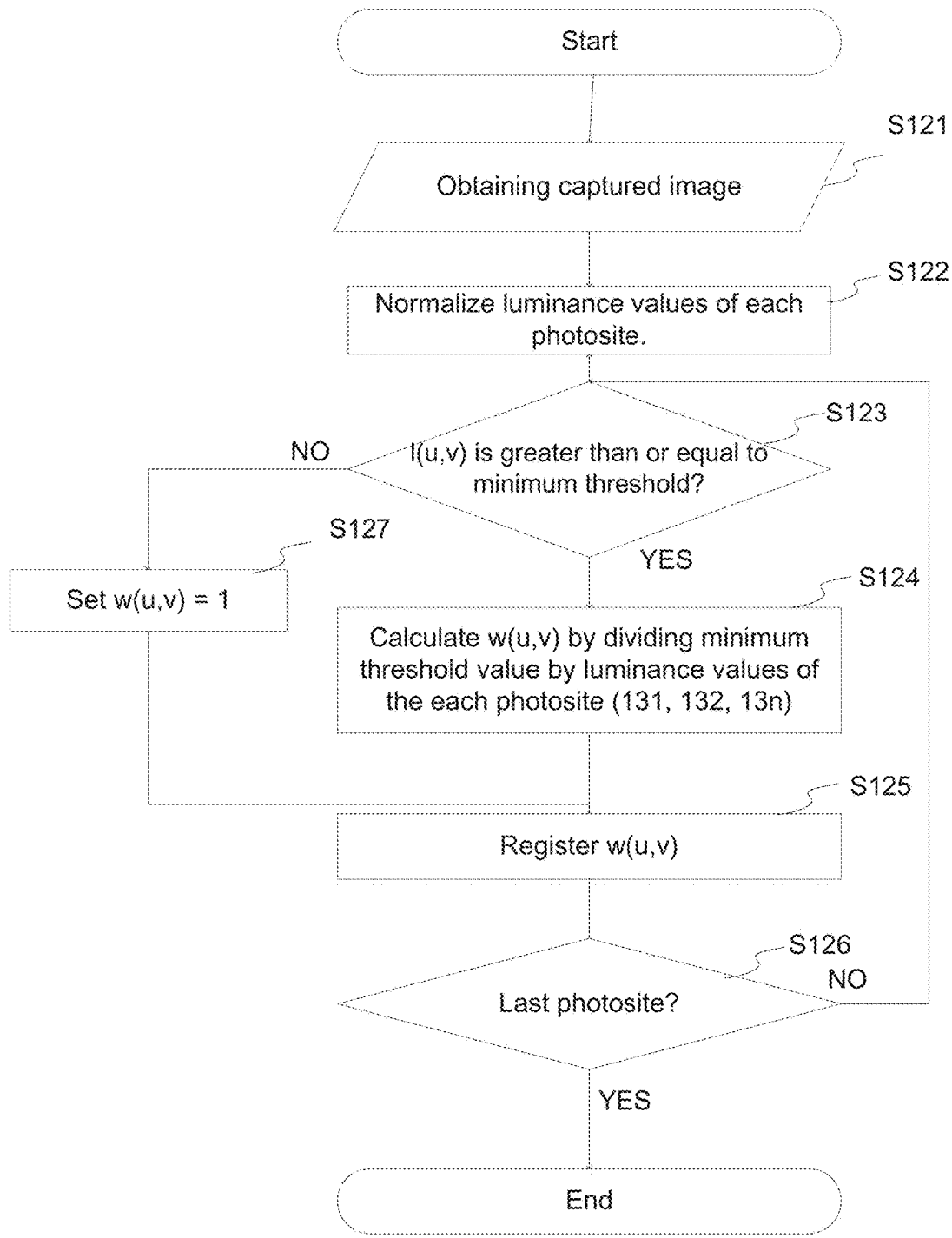
FIG. 12 generally shows an illustrative flow chart for calculating weight values for each photosite according to secondary embodiment of present disclosure.

FIG. 12 shows an illustrative flow chart for calculating sets of weight values (weight matrix) for photosites according to a secondary embodiment of present disclosure. It is important to know that calculation of a set of weight values is performed using the other lightfield camera 1 that is depicted in FIG. 1. Lightfield camera 1 has the same configuration as lightfield camera 1A which is depicted in FIG. 11 except for image sensor array 13. Image sensor array 13 of lightfield camera 1 which comprises photosites 131, 132, 133 to 13p of which sensitivities are not adjusted, in other word, the sensitivities of photosites 131, 132, 133 to 13p of lightfield camera 1 are homogeneous. Also, it is important to know that lightfield camera 1 has the same photosite arrangement (the number of photosite and alignment) as the lightfield camera 1A. In the following explanation, (u,v) refers to a coordinate of photosite on a sensor array plane 13 or 13A.

In step 121 (S121), lightfield camera 1 captures Lambertian object which radiates lights equally in all direction and send a signal to a processor 51. In other word, at Step 121 (S121), processor 51 obtains luminance values of the each photosite 131, 132, 133 to 13p of a lightfield camera 1 when a Lambertian object image is captured by the lightfield camera 1.

FIG. 12A shows an example of luminance value of 11×11 in total 121 photosites 131, 132, 133 to 13p corresponding to one microlense which locates at the center of the lenslet array 11.

FIG. 12A provides an example where the maximum luminance value is 220. In this example, the maximum luminance value is 220.

In step 122 (S122), the luminance values of each photosite 131, 132, 133 to 13$p$ may be normalized so that the maximum value to be transformed to the maximum magnitude that photosites can provide.

For example, 255 for 8 bit sensor;

$$l'(u,v)=255*l(u,v)/\max\_l(u,v)$$

FIG. 12B shows an example of normalized luminance value of 11×11 in total 121 photosites 131, 132, 133 to 13$p$ corresponding to one microlense.

The highlighted values are the photosites of which luminance values are above minimum threshold (min_threshold). In this exemplary embodiment, setting 25 to a minimum threshold (min_threshold=25). Those highlighted photosites need to be changed those sizes or fill factors to reduce the photons to be captured in order to level the intensities of lights to be captured by each photosite 131A, 132A, 133A to 13 $p$A.

In step 123 (S123) processor 51 determines if a normalized luminance value of i-th photosite 131, 132, 133 to 13$p$ is greater than or equal to a minimum threshold (min_threshold). A minimum threshold (min_threshold) is arbitrary preset value and is stored in the memory.

In step 124 (S124) processor 51 calculates a weight value for i-th photosite 131, 132, 133 to 13$p$ by dividing the minimum threshold (min_threshold) value by a luminance value of i-th photosite 131, 132, 133 to 13$p$ if a luminance value of this i-th photosite 131, 132, 133 to 13$p$ is greater than or equal to the minimum threshold (min_threshold).

For calculation of weight value, a following formula may be used;

$$w(u, v) = \begin{cases} \min\_threshold/(l'(u, v) & \text{when } l'(u, v) \geq \min\_threshold \\ 1 & \text{elsewhere} \end{cases}$$

Alternatively, the weight values may be calculated by following formula.

$$w(u,v)=\min\_threshold/\max(l'(u,v),\min\_threshold)$$

In step 125 (S125), processor 51 registers calculated weight value for i-th photosite 131, 132, 133 to 13$p$ to a memory in association with coordinate of a photosite 131, 132, 133 to 13$p$ (u,v) on a sensor array plane 13. For example, processor 51 registers weight value w in association with the location of photosite (u, v) on a sensor array plane 13 so that its calculated weight value to be applied to the photosite 131A, 132A, 133A to 13 $p$A of the same coordinate (u, v) on a sensor array plane 13A in a lightfield camera 1A.

In step 127 (S127), processor 51 set a weight value to "1" if it is determined that a luminance value of a photosite 131, 132, 133 to 13$p$ is not greater than or equal to the minimum threshold (min_threshold).

In step 126 (S126), processor 51 determines whether this i-th photosite 131, 132, 133 to 13$p$ is the last one or not. One of the exemplary way that processor 51 may determine whether this is the last photosite 131, 132, 133 to 13$p$ or not is comparing processing photosite number i with the maximum photosite number $i_{max}$ which is preregistered to a memory. For example, in case 100×100 in total 10000 photosites are comprised in device 5, processor 51 will terminate the loop when weight value for i=9999 (in case the "i" is integer from 0 to 9999) photosite is calculated. In this case, if it is not the last photosite, processor 51 increments the photosite number i and go back to step 123 (S123). If this is the last photosite $i_{max}$, the process is terminated since a set of weight values (weight matrix) is calculated.

In this flowchart, for enabling a reader to understand the present disclosure easily, photosite to be processed is expressed in the form of i-th. However, a person skilled in the art may understand that the different form of calculation can be used. For example, photosite to be processed can take the form of (u,v), then the process is terminated when the calculation for photosite at u=$u_{max}$ and v=$v_{max}$ (for example $u_{max}$=99 and $v_{max}$=99 for 100×100 sensor (in case the "u" and "v" are the integer from 0 to 99)) is completed.

FIG. 12C shows calculated a set of weight values for each photosite 131, 132, 133 to 13$p$ corresponding to one microlens.

Highlighted are the photosites of those sensitivities to be adjusted in accordance with each of the weight value, for example with following formula:

$$\text{Surface}(u,v)=\text{maximum\_surface}*w(u,v)$$

maximum_surface refers to the size or fill factor of the photosite which hit the min_threshold luminance value. In above described example, maximum_surface is defined with the size or fill factor of peripheral photosite which hit the luminance value 25.

For example, a central photosite of which a luminance value hit 255 in the last table, the size or fill factor may be adjusted in accordance with following formula;

$$\text{Size (or Fill Factor)}(u,v)=\text{Maximum\_Surface (or Fill Factor)}*0.098$$

Adjustment of sensitivities of respective photosites 131A, 132A, 133A to 13 $p$A can be implemented either by putting a cache partially hiding the receiving surface of each photosite 131A, 132A, 133A to 13 $p$A or making a mask in front of each photosite 131A, 132A, 133A to 13 $p$A to reduce the fill factors of each photosite 131A, 132A, 133A to 13 $p$A.

An alternative way to change the sensitivities of the photosites 131A, 132A, 133A to 13 $p$A is designing a grey filter pattern and to print it (for instance by evaporation technique) onto the photosites 131A, 132A, 133A to 13 $p$A, so that it attenuates the high values observed when capturing a white image.

By reducing the size or fill factor of the central photosites, sensitivities of the photosites are reduced. This results in darker images with more noise. In order to reduce the noise, the camera exposure time can be increased. Increasing the exposure time may provide a brighter and vignetting-free image. That is, the exposure time can be adjusted in consideration of brightness of the captured image In alternative implementation of the secondary embodiment, the peripheral photosites 131A, 132A, 133A to 13 $p$A that are affected by the vignetting effect can be designed to catch more photon based on a set of weight values calculated by the steps (described in FIG. 7 and FIG. 8) described in first embodiment. The fill factors or sizes of peripheral photosites may be increased in consideration with calculated weight values.

$$w'(u,v)=\max\_l'/\max(l'(u,v),\min\_threshold)$$

max_l' refers to a normalized maximum luminance value that is transformed to the maximum magnitude that photosites can provide. l'(u,v) refers to a normalized luminance value of photosite located at the coordinate (u,v). In case, 8 bit sensor is being used, the formula may be;

$w'(u,v) = 255/\max(l'(u,v), \text{min\_threshold})$ $\text{Surface}(u,v) = \text{minimum\_surface} * w'(u,v)$ minimum_surface refers to a size or fill factor of the smallest photosite that is desired to be manufactured, and it corresponds to the size of the photosites which hit the maximum luminance value. In above described example, minimum_surface is defined with the size or fill factor of central photosite which hit the luminance value 255 in the previously described table.

In another alternative implementation, fill factors or sizes of the peripheral photosites may be increased in consideration of the maximum meaningful fill-factor denoted by "Smax" (The value "Smax" is set by the manufacturer of the sensor, for example Smax=0.9), and the minimum denoted by "Smin" (The value "Smin" is set by the manufacturer of the sensor, for example Smin=0.2). The distance between the centers of two adjacent photosites are denoted by "PhotoSize" (The distance between each two adjacent photosite is assumed constant or homogeneous on the sensor array 13 to keep the formulation working). Denoting the threshold for cat's eye by "min_threshold", and the normalized luminance value [00101] as l'(u,v), fill factor or size of photosites at the coordinate (u,v) on sensor array plane 13 can be calculated by following equation:

$\text{Surface}(u,v) = (a(l'(u,v) - \text{min\_threshold}) + S\max) * \text{PhotoSize}$ $a = (S\min - S\max)/(255 - \text{min\_threshold})$ For example, original Fill factor or size of a photosite at (u,v) is 0.5 of the size of PhotoSize. Assuming that Smin=0.3 and Smax=0.9, the smallest Fill factor or size of photosites would be 0.3 of the PhotoSize, and the maximum to be 0.9 of the PhotoSize. For min_threshold=20, a photosite with l'(u,v)=min_threshold, fill factor or size of photosites needs to be 0.9 of PhotoSize, therefore bigger than the original Fill factor or size of photosites, and a photosite with l'(u,v)=255 needs to be 0.3 of PhotoSize, that is smaller than the original Fill factor or size of the photosites.

Figure 13:
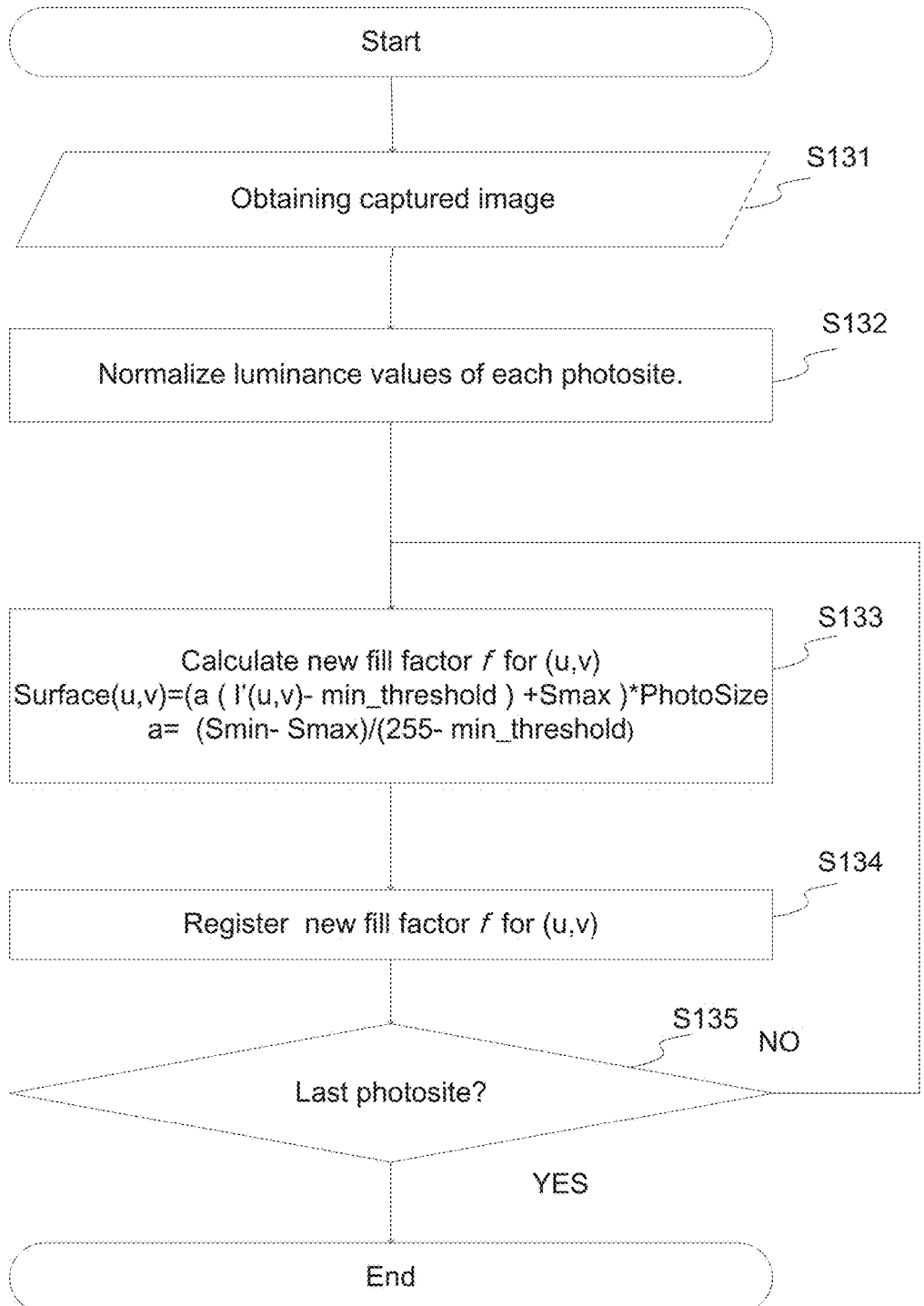
FIG. 13 shows an illustrative flow chart for calculating fill factor or size of each photosite according to a variant embodiment of present disclosure.

FIG. 13 shows an illustrative flow chart for calculating a set of fill factor or size of photosites f for photosites according to a secondary embodiment of present disclosure.

In step 131 (S131), lightfield camera 1 captures Lambertian object which radiates lights equally in all direction and send a signal to a processor 51. In other words, in step 131 (S131), processor 51 obtains luminance values of the each of the photosites 131, 132, 133 to 13p of a lightfield camera 1 when a Lambertian object image is captured by the lightfield camera 1.

In step 132 (S132), the luminance values of each photosite 131, 132, 133 to 13p may be normalized so that the maximum value to be transformed to the maximum magnitude that photosites can provide (255 for 8 bit sensor).

$l'(u,v) = 255 * l(u,v)/\max\_l(u,v)$

In step 133 (S133) processor 51 calculates a fill factor f for i-th photosite 131, 132, 133 to 13p with following formula.

$\text{Surface}(u,v) = (a(l'(u,v) - \text{min\_threshold}) + S\max) * \text{PhotoSize}$ $a = (S\min - S\max)/(255 - \text{min\_threshold})$ In step 134 (S134), processor 51 registers calculated fill factor f for i-th photosite 131, 132, 133 to 13p to a memory in association with location of a photosite 131, 132, 133 to 13p (u,v) on a sensor array plane 13. For example, processor 51 registers fill factor f in association with the location of photosite (u, v) on a sensor array plane 13 so that its calculated fill factor f to be applied to the photosite 131A, 132A, 133A to 13 pA of the same location (u, v) on a sensor array plane 13A in a lightfield camera 1A.

In step 135 (S135), processor 51 determines whether this i-th photosite 131, 132, 133 to 13p is the last one or not. One of the exemplary way that processor 51 may determines whether this is the last photosite 131, 132, 133 to 13p or not is comparing processing photosite number i with the maximum photosite number $i_{max}$ which is preregistered to a memory. For example, in case 100×100 in total 10000 photosite are comprised in device 5, processer 51 will terminate the loop when weight value for i=9999 (in case the "i" is integer from 0 to 9999) photosite is calculated. In this case, if it is not the last photosite, processor 51 increments the photosite number i and go back to step 133 (S133). If this is the last photosite $i_{max}$, process is terminated since a set of weight values (weight matrix) is calculated.

In this flowchart, for enabling a reader to understand the present disclosure easily, photosite to be processed is expressed in the form of i-th. However, a person skilled in the art may understand that the different form of calculation can be used. For example, photosite to be processed can take the form of (u,v), then the process is terminated when the calculation for photosite at $u=u_{max}$ and $v=v_{max}$ (for example $u_{max}=99$ and $v_{max}=99$ for 100×100 sensor (in case the "u" and "v" are the integer from 0 to 99)) is completed.

An another variant implementation (increasing the fill factors or sizes of peripheral photosites) does not require adjusting exposure time since an image to be captured is overall bright with less noise compared with the embodiment which reduces the fill factor or sizes of photosites.

Figure 14:
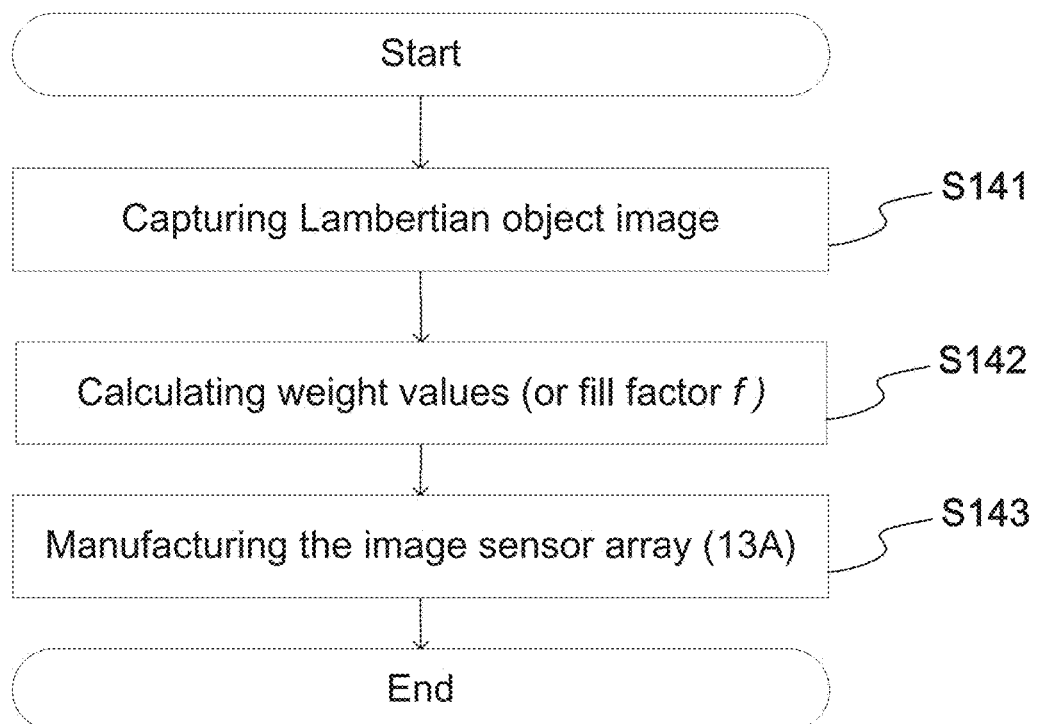
FIG. 14 shows an illustrative flow chart for manufacturing an image sensor array comprises a plurality of photosites according to an embodiment of present disclosure.

FIG. 14 shows an illustrative flow chart for manufacturing an image sensor array that comprises a plurality of photosites according to an embodiment of present disclosure.

Using lightfield camera 1, capturing uniformly illuminated Lambertian object which radiates lights equally in all direction and send a signal to a processor 51. In other words, at Step 141 (S141), processor 51 of another lightfield camera 1 (or processor 51 of a device 5 which is separately configured from lightfield camera 1) obtains luminance values of the each photosite 131, 132, 133 to 13p when a Lambertian object image is captured by the lightfield camera 1.

In step 142 (S142), calculating a set of weight values (weight matrix) (or new fill factor) for correcting a vignetting effect to be caused on an image based on the captured Lambertian object image.

In step 143 (S143), manufacturing the image sensor array 13A which comprises the photosites 131A, 132A, 133A to 13 pA having respective sensitivities adjusted in accordance with the calculated a set of weight values (or new fill factor) having associations with the each coordinate of photosites 131, 132, 133 to 13p of other lightfield camera 1. As described above, a weight value w (or new fill factor f) is registered associated with a coordinates (u,v) of photosite 131, 132, 133 to 13p on a sensor array plane 13 in a lightfield camera 1. A lightfield camera 1 includes the same configuration as the lightfield camera 1A except that sensitivities of photosites 131, 132, 133 to 13p of lightfield camera 1 are not adjusted (in other word, sensitivities of photosites 131, 132, 133 to 13p of lightfield camera 1 are homogeneous.). Therefore a number and arrangement of photosites 131, 132, 133 to 13p of the other lightfield camera 1 are the same with the photosites 131A, 132A, 133A to 13 pA of lightfield camera 1A. In the manufacturing phase, adjusting sensitivities of respective photosites 131A, 132A, 133A to 13 $p$A in accordance with the respective weight values (or new fill factor f) associated with the respective coordinates on a sensor array plane 13. For example, a sensitivity of a photosite 131A, 132A, 133A to 13 $p$A at coordinate (0,5) on a sensor array plane 13A will be adjusted according to the weight value (or new fill factor f) associated with a coordinate (0,5) on a sensor array plane 13.

It should be appreciated that all the other various implementations for adjusting sensitivities of the photosites 131A, 132A, 133A to 13 $p$A could be used in this invention.

The above disclosed tables or formula or flowchart are just examples to introduce the principles of the various embodiments. It would be appreciated that formula, threshold, computation for luminance values or computation for weight values are not limited thereto and many modifications and additions thereto may be made within the scope of the invention.

According to the an embodiment of present disclosure, a user may download sets of weight values (sets of weight matrix) from the source outside or acquiring the sets of weight values by calibration steps detailed in this description, and registers the acquired sets of weight values into weight matrix storage 87. Weight matrix storage 87 stores sets of weight values each associated with respective zoom/focus setting. The system can find matching a set of weight values to present zoom/focus setting from the weight matrix storage 87 for correcting vignetting effect caused on an image captured by a lightfield camera 1. Therefore changing the luminance values of each photosite 131, 132, 133 to 13$p$ will be effective to solve the technical problem stated in the section above.

According to the another embodiment of present disclosure, sensitivities of each photosite 131A, 132A, 133A to 13 $p$A of a lightfield camera 1A are adjusted in accordance with the a set of calculated weight values using other lightfield camera 1. A lightfield camera 1A may further comprise an additional lens 21 which contributes to estimate one set of micro-image centers for every set of focusing-distance/zoom parameters of the lightfield camera 1. Therefore changing the sensitivities of each photosite 131A, 132A, 133A to 13 $p$A will be effective to solve the technical problem stated in the section above.

Naturally, the present disclosure is not limited to the embodiments previously described. In particular, the present disclosure is not limited to a lightfield camera 1 or 1A but also extends to the method of controlling and/or calibrating the same and to the hardware circuitry implementing the controlling/calibration method.

The method of correcting the vignetting effect caused on an image captured by a lightfield camera 1 or 1A described herein may be implemented by instructions being performed by a processor 51, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may take the form of an application program tangibly embodied on a processor-readable medium. Instructions may be, for example, in hardware, firmware, software, or a combination. Instructions may be found in, for example, an operating system, a separate application, or a combination of the two. A processor 51 may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for correcting vignetting effect caused on an image captured by a lightfield camera comprising an image sensor array including plurality of photosites, the method comprising:

obtaining luminance values from each photosite;

obtaining a set of weight values for compensating the vignetting effect for each photosite, wherein said set of weight values is associated with a present setting of the lightfield camera; and changing the luminance values of each photosite based on the obtained set of the weight values wherein luminance values of each photosite are normalized to be transformed to a maximum magnitude, wherein a Lambertian object image is captured to generate luminance values of each photosite and wherein the weight values are calculated by:

determining a maximum luminance value from the generated luminance values;

dividing the maximum luminance value by the generated luminance values of the photosites when the Lambertian object image is captured to calculate the weight values;

comparing each luminance value of the generated luminance values with a first value; and if the compared luminance value of a corresponding photosite is less than the first value, setting a respective weight value of the corresponding photosite equal to 0.

2. The method according to claim 1, wherein the changing the luminance values of each photosite is performed by multiplying the luminance values of each photosite by the respective weight values associated with each photosite.

3. A device for correcting vignetting effect caused on an image captured by a lightfield camera comprising image sensor array including plurality of photosites, the device comprising a storage storing a set of weight values for compensating the vignetting effect for each photosite and a processor configured to perform:
- obtaining luminance values of each photosite;
- obtaining a set of weight values for each photosite; and
- changing the luminance values of each photosite based on the obtained set of weight values wherein luminance values of each photosite are normalized to be transformed to a maximum magnitude, wherein a Lambertian object image is captured to generate luminance values of each photosite and wherein the weight values are calculated by:
- determining a maximum luminance value from the generated luminance values;
- dividing the maximum luminance value by the generated luminance values of the photosites when the Lambertian object image is captured to calculate the weight values;
- comparing each luminance value of the generated luminance values with a first value; and
- if the compared luminance value of a corresponding photosite is less than the first value, setting a respective weight value of the corresponding photosite equal to 0.

4. The device according to claim 3, wherein the lightfield camera further comprises:
- a primary lens;
- a lenslet array including a plurality of microlenses located between the image sensor array and the primary lens;
- an additional lens being arranged between the primary lens (10) and the microlenses at a distance (L1) from the primary lens, the additional lens having a focal length corresponding to the distance (L1).

5. Non-transitory tangible computer-readable medium comprising a computer program product recorded thereon and capable of being run by a processor, including program code instructions for implementing the steps of a method according to claim 1.

* * * * *